United States Patent
Nakano

(10) Patent No.: US 10,552,652 B2
(45) Date of Patent: Feb. 4, 2020

(54) RFID SYSTEM AND INFORMATION PROCESSING METHOD

(71) Applicant: OMRON Corporation, Kyoto (JP)

(72) Inventor: Yoshimitsu Nakano, Ritto (JP)

(73) Assignee: OMRON Corporation, Kyoto (JP)

( * ) Notice: Subject to any disclaimer, the term of this patent is extended or adjusted under 35 U.S.C. 154(b) by 95 days.

(21) Appl. No.: 16/004,431

(22) Filed: Jun. 11, 2018

(65) Prior Publication Data

US 2019/0102583 A1 Apr. 4, 2019

(30) Foreign Application Priority Data

Sep. 29, 2017 (JP) ................................ 2017-189624

(51) Int. Cl.
| | |
|---|---|
| G06K 7/08 | (2006.01) |
| G06K 7/10 | (2006.01) |
| H04B 17/00 | (2015.01) |
| H04B 5/00 | (2006.01) |
| H04B 17/318 | (2015.01) |
| G06K 19/07 | (2006.01) |
| G06T 11/20 | (2006.01) |

(52) U.S. Cl.
CPC ..... *G06K 7/10366* (2013.01); *G06K 19/0723* (2013.01); *G06T 11/206* (2013.01); *H04B 5/0062* (2013.01); *H04B 17/0085* (2013.01); *H04B 17/318* (2015.01)

(58) Field of Classification Search
CPC ...... G06K 7/0008; G06F 3/1454; G06F 3/147
USPC ....................................................... 235/451
See application file for complete search history.

(56) References Cited

U.S. PATENT DOCUMENTS

| | | | |
|---|---|---|---|
| 8,570,172 B2* | 10/2013 | Al-Mahdawi | H04B 17/27 235/492 |
| 2005/0258966 A1* | 11/2005 | Quan | G06K 7/10128 340/572.7 |
| 2007/0247286 A1* | 10/2007 | Drago | G06K 19/0716 340/10.4 |

(Continued)

FOREIGN PATENT DOCUMENTS

| | | |
|---|---|---|
| JP | 2008219503 | 9/2008 |
| JP | 2009037327 | 2/2009 |

(Continued)

*Primary Examiner* — Ahshik Kim
(74) *Attorney, Agent, or Firm* — JCIPRNET

(57) ABSTRACT

The disclosure supports installation of a plurality of communication devices at suitable positions. An RFID system stores first chronological data representing a reception level of a signal at a first communication device and second chronological data representing a reception level of a signal at a second communication device in a measurement period. The system specifies a higher reception level of the reception levels at the first and second communication devices corresponding to an elapsed time from a start time of the measurement period in the first and second chronological data at every elapsed time from the start time and generates third chronological data representing the specified reception level. The system selectively displays at least one of an image based on the first chronological data, an image based on the second chronological data, and an image based on the third chronological data, or display these images at the same time.

18 Claims, 22 Drawing Sheets

(56) References Cited

U.S. PATENT DOCUMENTS

2012/0161930 A1* 6/2012 Subramanian ....... G06K 7/0008
340/10.1
2016/0139237 A1* 5/2016 Connolly .................. G01S 5/02
340/10.1

FOREIGN PATENT DOCUMENTS

JP 2011001132 1/2011
JP 2014183437 9/2014

* cited by examiner

RFID SYSTEM AND INFORMATION PROCESSING METHOD

CROSS-REFERENCE TO RELATED APPLICATION

This application claims the priority of Japan patent application serial no. 2017-189624, filed on Sep. 29, 2017. The entirety of the above-mentioned patent application is hereby incorporated by reference herein and made a part of this specification.

BACKGROUND

Technical Field

The disclosure relates to an RFID (radio frequency identification) system and an information processing method for the RFID system.

Description of Related Art

It is a conventional technique to manage baggage by attaching an RF (Radio Frequency) tag to a baggage item to realize non-contact communication (wireless communication) between the RF tag and a reader/writer (communication device). For example, if the reader/writer is disposed at a baggage entrance/exit port, data such as ID (Identification) may be automatically read from the RF tag attached to the baggage to be transported. With such a configuration, logistics becomes more efficient.

As an example, Japanese Laid-open No. 2009-37327 (Patent Document 1) discloses a wireless communication device that communicates with a wireless tag, such as an RF tag. The wireless communication device includes a plurality of antennas, and selects one of the antennas as a transmitting antenna and selects an antenna from the antennas other than the transmitting antenna as a receiving antenna. The wireless communication device emits a radio wave for detecting a passing object from the transmitting antenna and measures a reception level of the detection radio wave received by the receiving antenna. The wireless communication device determines whether a passing object is present or not based on the reception level obtained through measurement. When determining that a passing object is present, the wireless communication device selects a transmitting/receiving antenna to emit a radio wave for reading data recorded in an IC of the wireless tag, and receive a response radio wave from the wireless tag.

Japanese Laid-open No. 2008-219503 (Patent Document 2) discloses a reader/writer which cooperates with another reader/writer in carrying out wireless communication with an RF tag. The reader/writer measures a reception level and detects whether or not there is a radio wave transmitted from another reader/writer of an opposite station. If the reader/writer detects that a radio wave is being transmitted from another reader/writer, the reader/writer outputs a radio wave and measures the reception level at the time. The reader/writer also synchronizes with the another reader/writer based on the reception level of the received radio wave.

Japanese Laid-open No. 2011-1132 (Patent Document 3) discloses a wireless ID tag system using a wireless ID tag. The wireless ID tag system determines an unnecessary wireless tag based on a chronological change in received power. In addition, the wireless ID tag system performs filtering to delete ID information of the unnecessary wireless ID tag from ID information of received wireless ID tags. Moreover, the wireless ID tag system determines an order of a plurality of wireless ID tags passing through each gate based on chronological changes of received signal strength values with respect to the wireless ID tags passing through each gate.

Japanese Laid-open No. 2014-183437 (Patent Document 4) discloses a system including a reader/writer that serves as a master and a reader/writer that serves as a slave.

[Patent Document 1] Japanese laid-open No. 2009-37327
[Patent Document 2] Japanese laid-open No. 2008-219503
[Patent Document 3] Japanese laid-open No. 2011-1132
[Patent Document 4] Japanese laid-open No. 2014-183437

In an ultra high frequency (UHF) band RFID (Radio Frequency Identification) system, it is common to adopt a configuration where a plurality of readers/writers, referred to as gates, are connected in an application that collectively reads a plurality of RF tags. For example, in shipment/receiving inspection or inventory management work, there are occasions where UHF band RF tags attached to a plurality of packaging boxes on a pallet are read collectively.

Accordingly, in an occasion where a plurality of readers/writers are installed, an interval between the readers/writers, the height at which the readers/writers are installed, and so on are taken into consideration beforehand. Moreover, it is important to design a readable range (communication area) of each of the readers/writers and carry out a test in advance. In the test, the RF tags read by each antenna, the number of RF tags read, reception levels with respect to the RF tags, a reading rate (accuracy), etc., are measured to adjust installation positions of the readers/writers. None of Patent Documents 1 to 4 discloses the adjustment to the installation positions of the readers/writers.

Exemplary embodiments of the disclosure provide an RFID system and an information processing method technically supporting a plurality of communication devices to be installed at suitable positions with use of reception levels from RF tags.

SUMMARY

According to an embodiment of the disclosure, a radio frequency identification (RFID) system includes a display device, a first communication device, and a second communication device. The first communication device communicates with a first radio frequency (RF) tag, which moves, in a non-contact manner. The second communication device communicates with the first RF tag in a non-contact manner. The first communication device and the second communication device repetitively output communication signals and measure a reception level of a first signal transmitted from the first RF tag based on the communication signals. The RFID system includes a memory part, a generating part, and a display control part. The memory part stores first chronological data representing the reception level of the first signal received by the first communication device in a predetermined measurement period and second chronological data representing the reception level of the first signal received by the second communication device in the measurement period. The generating part specifies a higher reception level of the reception level of the first signal at the first communication device and the reception level of the first signal at the second communication device corresponding to an elapsed time from a start time of the measurement period in the first chronological data and the second chronological data at every elapsed time from the start time and generates third chronological data representing the specified reception level. The display control part selectively displays at least one of a first image based on the first chronological data, a second image based on the second chronological data, and a third image based on the third chronological data on the display device or displays the first image, the second image, and the third image on the display device at the same time.

According to another embodiment of the disclosure, an information processing method is provided for a radio frequency identification (RFID) system. The RFID system includes a first communication device communicating with a radio frequency (RF) tag, which moves, in a non-contact manner and a second communication device communicating with the RF tag in a non-contact manner. The information processing method includes: storing first chronological data representing a reception level of a signal received by the first communication device in a predetermined measurement period and second chronological data representing a reception level of a signal received by the second communication device in the measurement period; specifying a higher reception level of the reception level of the signal at the first communication device and the reception level of the signal at the second communication device corresponding to an elapsed time from a start time of the measurement period in the first chronological data and the second chronological data at every elapsed time from the start time and generating third chronological data representing the specified reception level; and selectively displaying at least one of a first image based on the first chronological data, a second image based on the second chronological data, and a third image based on the third chronological data on a display device or displaying the first image, the second image, and the third image on the display device at the same time.

DESCRIPTION OF THE EMBODIMENTS

Figure 1:
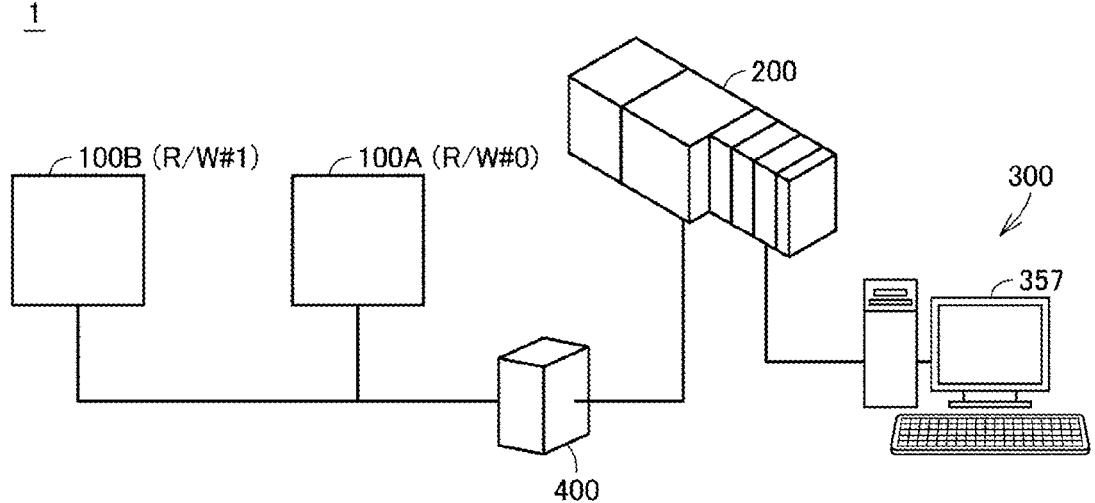
FIG. 1 is a view showing an example of a system configuration of an RFID system.

According to the above configuration, it is possible for the user of the RFID system to separately learn values and transitions of the reception levels of the first communication device and the second communication device by viewing the first image and the second image. Furthermore, the user may also learn values and transitions of the reception level at the time when the first RF tag is detected by the two communication devices by viewing the third image.

Such three images may serve as a guideline for the user to change installation positions of the first communication device and the second communication device. Therefore, it is possible for the user to find suitable installation positions of the first communication device and the second communication device by repetitively changing the installation positions of the first communication device and the second communication device and measuring the reception levels.

According to an embodiment of the disclosure, the first image is a first graph including the first chronological data as a graph component, the second image is a second graph including the second chronological data as a graph component, and the third image is a third graph including the third chronological data as a graph component.

According to the above configuration, with the graphic display, transitions of the reception levels of the first communication device and the second communication device are learned easily. In addition, by viewing the third image, the user is able to easily learn transitions of the reception levels at the time when the two communication devices detect the first RF tag.

According to an embodiment of the disclosure, the display control part displays a user interface for receiving a user operation for selectively displaying at least one of the first graph, the second graph and the third graph on the display device.

According to the above configuration, it is possible to display a graph desired by the user among a plurality of graphs.

According to an embodiment of the disclosure, the first communication device and the second communication device communicate with a second RF tag moving simultaneously with the first RF tag in a non-contact manner. The first communication device and the second communication device further measure a reception level of a second signal transmitted from the second RF tag by repetitively outputting the communication signals. The memory part further stores fourth chronological data representing the reception level of the second signal received by the first communication device in the measurement period and fifth chronological data representing the reception level of the second signal received by the second communication device in the measurement period. The display control part displays a graph serving as the first image and including each of the first chronological data and the fourth chronological data as a graph component and a graph serving as the second image and including each of the second chronological data and the fifth chronological data as a graph component.

According to the above configuration, the user of the RFID system may separately learn values and reception levels of the first communication device and the second communication in the communication with the two RF tags by viewing the first image and the second image.

Therefore, compared with adjusting the installation positions by using one RF tag, it is possible to find more suitable installation positions of the first communication device and the second communication device.

According to an embodiment of the disclosure, the generating part specifies a higher reception level of the reception level of the second signal at the first communication device and the reception level of the second signal at the second communication device corresponding to the elapsed time from the start time of the measurement period in the fourth chronological data and the fifth chronological data at every elapsed time from the start time and further generates sixth chronological data representing the specified reception level. The display control part displays a graph serving as the third image and including each of the third chronological data and the sixth chronological data as a graph component.

According to the above configuration, the user may learn values and transitions of the reception levels at the time when two RF tags are detected by two communication devices by viewing the third image.

Therefore, compared with adjusting the installation positions by using one RF tag, it is possible to find more suitable installation positions of the first communication device and the second communication device.

According to an embodiment of the disclosure, the display control part selectively displays at least one of a first bar graph representing a temporal transition of the number of RF tags read by the first communication device, among a plurality of RF tags including the first RF tag, in the measurement period and a second bar graph representing a temporal transition of the number of RF tags read by the second communication device, among the RF tags, in the measurement period on the display device, or the display control part displays the first bar graph and the second bar graph on the display device at the same time.

According to the above configuration, it is possible for the user to find suitable installation positions of the first communication device and the second communication device with reference to the first bar graph and the second bar graph.

According to an embodiment of the disclosure, the display control part further displays a third bar graph representing a temporal transition of the number of RF tags read by both of the first communication device and the second communication device, among the RF tags, in the measurement period on the display device.

According to the above configuration, it is possible for the user to find suitable installation positions of the first communication device and the second communication device by further referring to the third bar graph.

According to an embodiment of the disclosure, when both of the first communication device and the second communication device communicate with the first RF tag in the measurement period, the display control part further displays a maximum value of the reception levels during the communication on the display device.

According to the above configuration, it is possible for the user to find suitable installation positions of the first communication device and the second communication device with reference to the maximum value of the reception levels.

According to an embodiment of the disclosure, the display control part selectively displays at least one of a first bar graph representing a temporal transition of the number of times of communication between the first communication device and the first RF tag in the measurement period and a second bar graph representing a temporal transition of the number of times of communication between the second communication device and the first RF tag in the measurement period on the display device, or the display control part displays the first bar graph and the second bar graph on the display device at the same time.

According to the above configuration, it is possible for the user to find suitable installation positions of the first communication device and the second communication device by referring to the first bar graph and the second bar graph.

According to the above method, it is possible for the user of the RFID system to separately learn values and transitions of the reception levels of the first communication device and the second communication device by viewing the first image and the second image. Furthermore, the user may also learn values and transitions of the reception level at the time when the first RF tag is detected by the two communication devices by viewing the third image.

Such three images may serve as a guideline for the user to change installation positions of the first communication device and the second communication device. Therefore, it is possible for the user to find suitable installation positions of the first communication device and the second communication device by repetitively changing the installation positions of the first communication device and the second communication device and measuring the reception levels.

According to the embodiments of the disclosure, it is possible for the user to find suitable installation positions for the first communication device and the second communication device.

Hereinafter, the embodiments of the disclosure will be described with reference to the drawings. In the following description, the same parts are denoted by the same reference numerals. The names and functions of the same parts are also the same. Therefore, detailed description of the same parts will not be repeated.

1. Example of Application

This example is suitable for adjusting an installation position of a reader/writer. Nevertheless, if the reader/writer is configured with a body and an antenna as separate members, this example is suitable for adjusting an installation position of the antenna.

In the following, an example of a scenario, to which the disclosure is applied, is described with reference to FIGS. 1 to 4.

FIG. 1 is a view showing an example of a system configuration of an RFID system 1. Referring to FIG. 1, the RFID system 1 includes a reader/writer 100A, a reader/writer 100B, a programmable logic controller (PLC) 200, a personal computer (PC) 300, and a hub 400.

The reader/writer 100A and the reader/writer 100B are communicably connected to the PLC 200 via the hub 400.

Typically, the reader/writer 100A and the reader/writer 100B are connected to the PLC 200 by EtherCAT (a registered trademark standing for "Ethernet for Control Automation Technology").

The reader/writer 100A and the reader/writer 100B communicate with a radio frequency (RF) tag in a non-contact manner. In this example, the reader/writer 100A and the reader/writer 100B have built-in antennas for communication with the RF tag. The reader/writer 100A and the reader/writer 100B repetitively output communication signals and measure reception levels of signals transmitted from the RF tag based on the communication signals.

The reader/writer 100A and the reader/writer 100B store data such as whether or not the RF tag is successfully detected, an ID code when the RF tag is successfully detected, the reception level of the signal transmitted from the RF tag, and the like as a communication result with the RF tag. The reader/writer 100A and the reader/writer 100B sequentially transmit the communication results to the PC 300 via the PLC 200.

In the following, the reader/writer 100A is also referred to as "R/W#0", and the reader/writer 100B is also referred to as "R/W#1".

Figure 2:
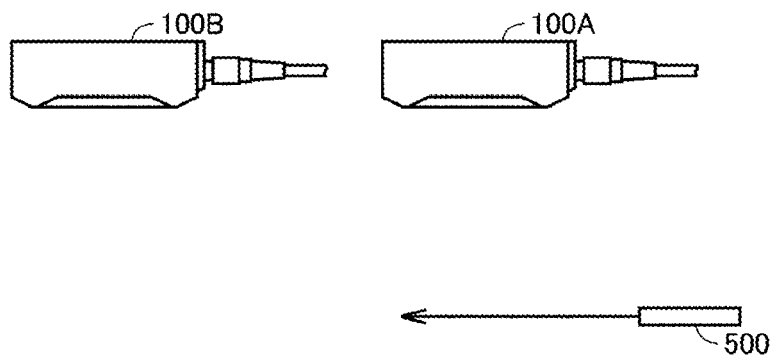
FIG. 2 is a view showing a position relation between two readers/writers.

FIG. 2 is a view showing a position relation between the reader/writer 100A and the reader/writer 100B.

Referring to FIG. 2, the reader/writer 100A and the reader/writer 100B are installed separately in a movement direction (a direction indicated by the arrow) of an RF tag 500. In this case, the reader/writer 100B detects the RF tag 500 after the reader/writer 100A detects the RF tag 500. In this example, the RF tag 500 is attached to a baggage item and moves as the baggage item moves.

The PC 300 stores chronological data (hereinafter also referred to as "chronological data DA") representing a reception level of a signal received by the reader/writer 100A in a predetermined measurement period T, and chronological data (hereinafter also referred to as "chronological data DB") representing a reception level of a signal received by the reader/writer 100B in the measurement period T.

The measurement period T is determined in advance based on a moving speed of the RF tag 500. As an example, the measurement period T may be set as 60 seconds.

Figure 3:
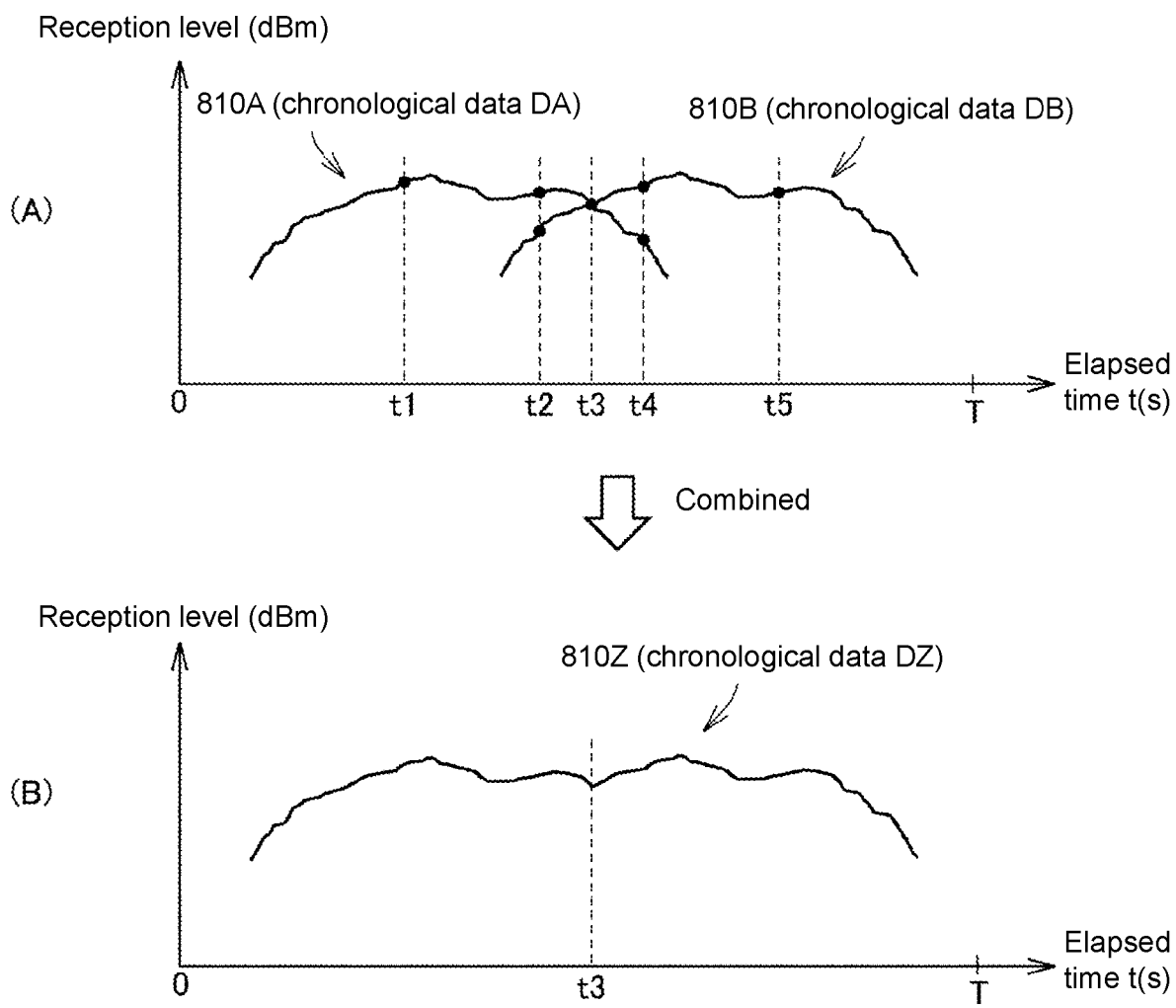
FIG. 3 is a diagram demonstrating data processing carried out in a PC.

FIG. 3 is diagram demonstrating data processing carried out in the PC 300. Referring to (A) and (B) of FIG. 3, data 810A is a graphic representation of the chronological data DA, whereas data 810B is a graphic representation of the chronological data DB. The chronological data DA and the chronological data DB are collections of discrete data, but have been processed by interpolation and the like to be represented as line segments.

The PC 300 specifies a higher one of a reception level of the signal at the reader/writer 100A and a reception level of the signal at the reader/writer 100B corresponding to an elapsed time from a start time (t=0) of a measurement period T in the chronological data DA and the chronological data DB at every elapsed time from the start time, and generates chronological data representing the specified reception level. In other words, the PC 300 chooses a higher value between the reception levels, which are the two objects under comparison, and generates the chronological data composed of the chosen value. In the following, the chronological data generated by such a process is also referred to as "chronological data DZ".

The chronological data DZ may be generated after the measurement period T ends. Alternatively, the latest chronological data DZ may be generated with updating of both of the chronological data DA and the chronological data DB as a trigger. In other words, the configuration may be made such that the chronological data DZ is sequentially updated as time elapses.

For example, at an elapsed time t1, the PC 300 selects the reception level of the signal at the reader/writer 100A. In other words, the PC 300 selects a value included in the chronological data DA (the data 810A). Similarly, at an elapsed time t2, the PC 300 selects the reception level of the signal at the reader/writer 100A.

Since the reception levels are the same at an elapsed time t3, the PC 300 selects either the reception level of the signal at the reader/writer 100A or the reception level of the signal at the reader/writer 100B. Which one of the reception levels is selected is defined in advance in the PC 300.

At an elapsed time t4, the PC 300 selects the reception level of the signal at the reader/writer 100B. In other words, the PC 300 selects a value included in the chronological data DB (the data 810B). Similarly, at an elapsed time t5, the PC 300 selects the reception level of the signal at the reader/writer 100B.

Such a selecting (specifying) process is not only carried out for the data at the elapsed times t1, t2, t3, t4, and t5, but also for all the data included in the measurement period T.

Data 810Z is a graphic representation of the chronological data DZ created by such a reception level selection process. The data 810Z shows the same value as the data 810A until the elapsed time t3. After the elapsed time t3, the data 810Z shows the same value as the data 810B.

Figure 4:
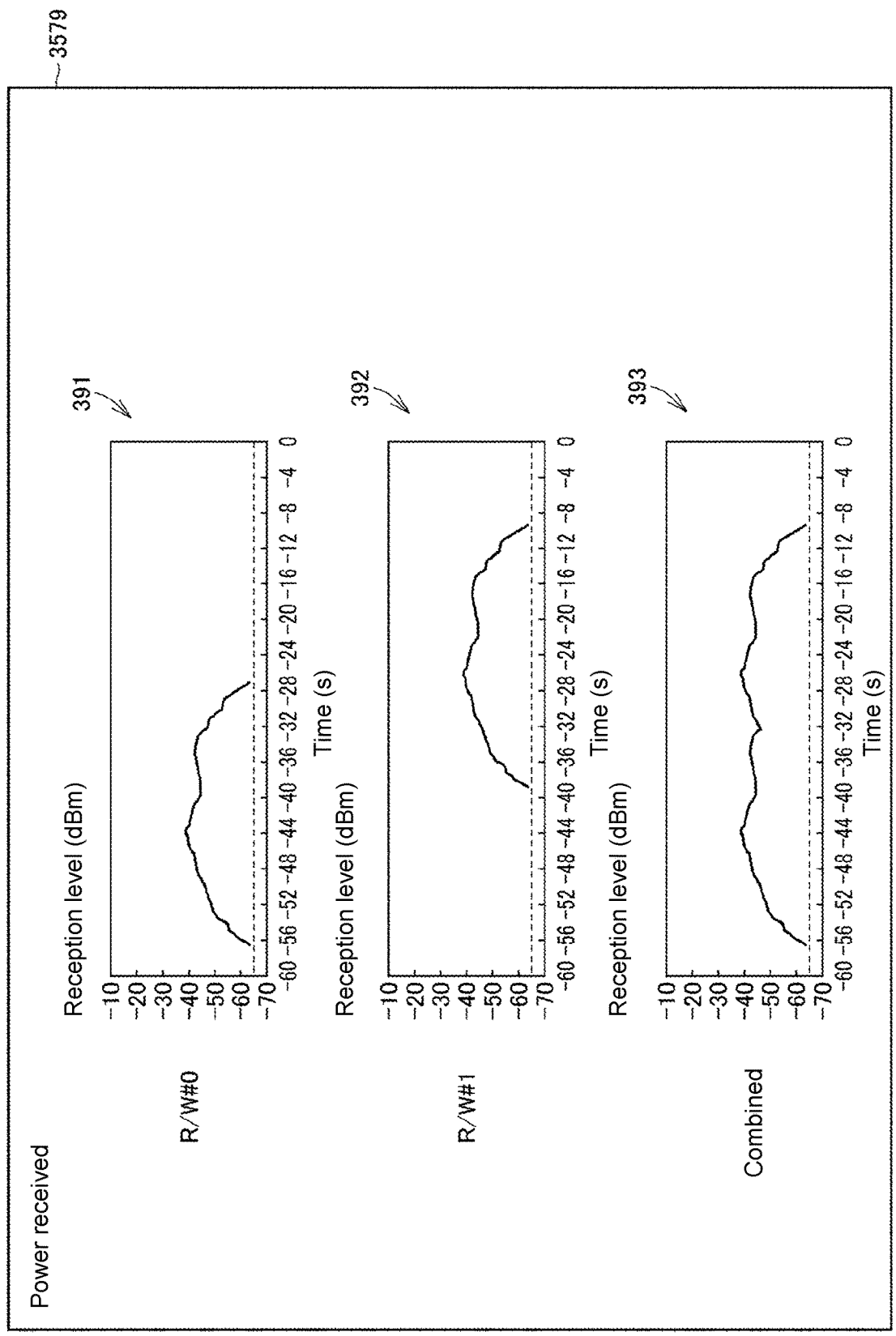
FIG. 4 is a view showing an example of a screen displayed on a display of a PC.

FIG. 4 a view showing an example of a screen displayed on a display 357 of the PC 300. The PC 300 displays a screen 3579 including a first image based on the chronological data DA, a second image based on the chronological data DB, and a third image based on the chronological data DZ on the display 357.

Typically, as shown in FIG. 4, the PC 300 displays a graph 391 (a graph of R/W#0) based on the chronological data DA, a graph 392 (a graph of R/W#1) based on the chronological data DB, and a graph 393 (a combined graph) based on the chronological data DZ at the same time.

Nevertheless, the disclosure is not limited to such display. The PC 300 may also be configured to selectively display at least one of the first image, the second image, and the third image.

By displaying in this way, the user of the RFID system 1 may separately learn values and transitions of the reception levels of the reader/writer 100A and the reader/writer 100B by viewing the first image (typically the graph 391 showing R/W#0) and the second image (typically the graph 392 showing R/W#1). Furthermore, the user may also recognize the values and transitions of the reception level at the time when the RF tag 500 is detected by using the two reader/writers 100A and 100B by viewing the third image (typically, the combined graph 393).

The three images may serve as a guideline for the user to change installation positions of the reader/writer 100A and the reader/writer 100B. Therefore, it is possible for the user to find suitable installation positions of the reader/writer 100A and the reader/writer 100B by repetitively changing the installation positions of the reader/writer 100A and the reader/writer 100B and measuring the reception levels.

While FIG. 1 illustrates an example of the configuration where the readers/writers 100A and 100B are communicably connected to the PC 300 via the PLC 200 or the like, the disclosure is not limited thereto. The readers/writers 100A and 100B and the PC 300 may also be connected without the PLC 200. In other words, the PC 300 may be directly connected to the hub 400.

Furthermore, the first image, the second image, and the third image are not limited to the graphs 391 to 393, and may be images listing numerical values included in the chronological data.

2. Example of Configuration

A. SYSTEM CONFIGURATION

Figure 5:
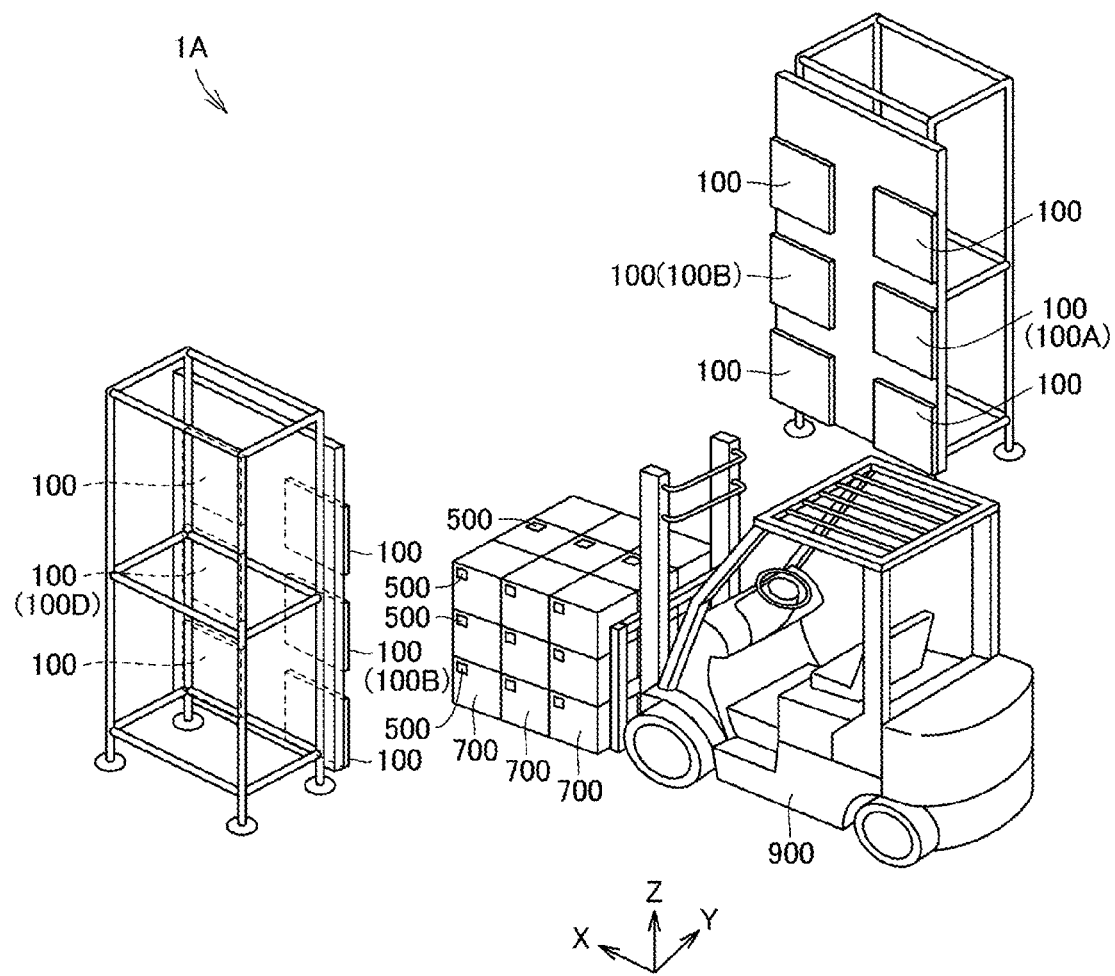
FIG. 5 is a view showing an example of a scenario in which an RFID system is used.

FIG. 5 is a view showing an example of a scenario in which an RFID system 1A is used.

Referring to FIG. 5, the RFID system 1A includes a plurality of readers/writers 100 and the RF tags 500. The readers/writers 100 are respectively installed on wall surfaces opposite to each other. Typically, the readers/writers 100 are arranged to be apart from each other in vertical and horizontal directions on each wall surface.

A forklift 900 passes through an area between the two wall surfaces. The two wall surfaces with the readers/writers 100 serve as a gate.

The forklift 900 passes through the gate while carrying a plurality of baggage items 700 to which RF tags are respectively attached, during which the readers/writers 100 communicate with the RF tags 500.

Figure 6:
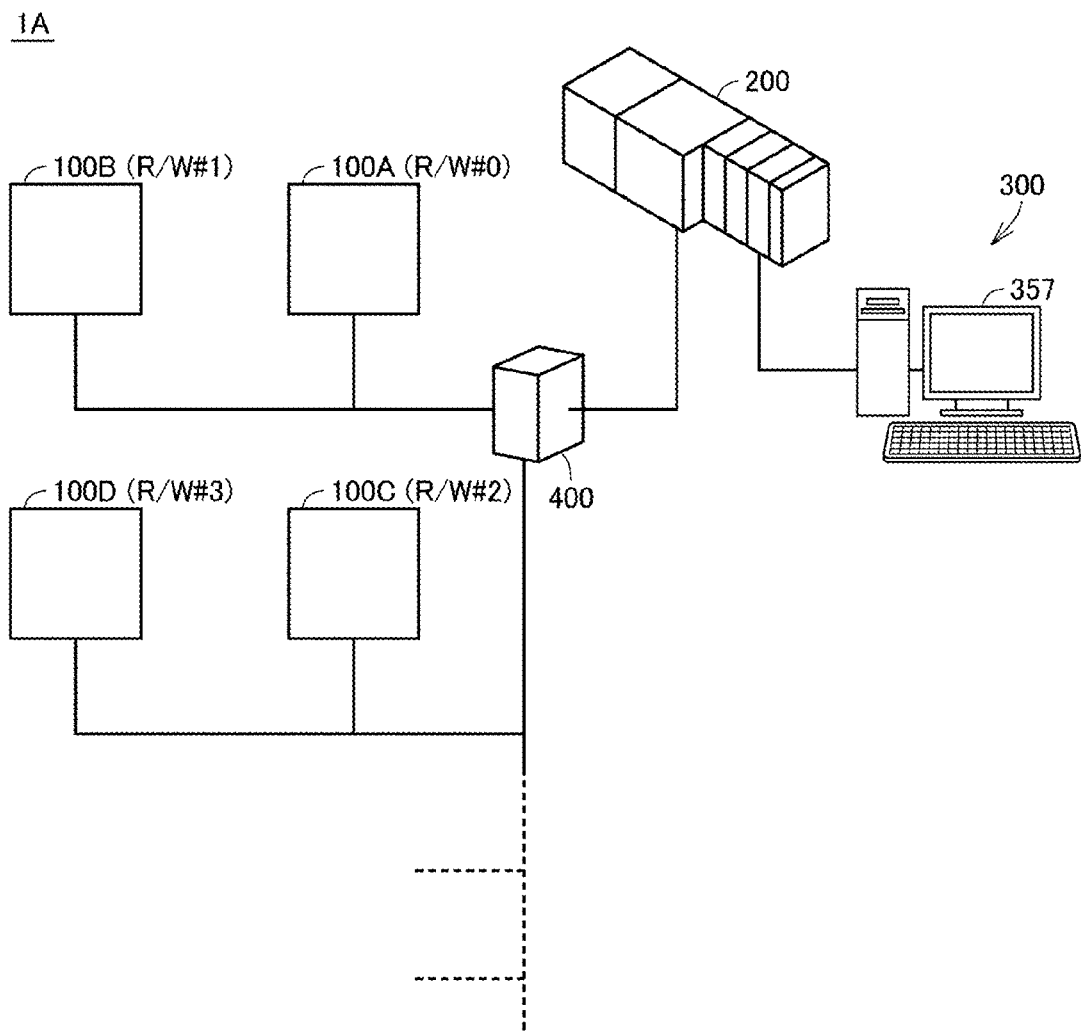
FIG. 6 is a view showing an example of a system configuration of an RFID system.

FIG. 6 is a view showing an example of a system configuration of the RFID system 1A. Referring to FIG. 6, the RFID system 1A includes a plurality of readers/writers 100A, 100B, 100C, 100D . . . , the PLC 200, the PC 300, and the hub 400. In the following, the readers/writers will simply be described as "readers/writers 100" when not particularly distinguished from each other.

The readers/writers 100 are respectively communicably connected to the PLC 200 via the hub 400. The readers/writers 100 and the PLC 200 are typically connected by EtherCAT. The readers/writers 100 communicate with the RF tags in a non-contact manner. Each of the readers/writers 100 has a built-in antenna for communication with the RF tag.

The reader/writer 100A serves as a master reader/writer in the RFID system 1A, and the rest readers/writers 100B, 100C, 100D . . . serve as slave readers/writers in the RFID system 1A.

The PC 300 repetitively transmits communication commands to each reader/writer 100 in a predetermined order. Each of the communication commands includes identification information for identifying to which the reader/writer 100 the communication command is directed.

When focusing on the readers/writers 100A to 100D, the PC 300 transmits the communication commands in the order of "reader/writer 100A"→"reader/writer 100B" →"reader/writer 100C"→"reader/writer 100D"→"reader/writer 100A"→"reader/writer 100B"→"reader/writer 100C"→"reader/writer 100D"→"reader/writer 100A", . . . , for example.

Specifically, the PC 300 transmits the communication commands to the reader/writer 100A serving as the master. When the reader/writer 100A receives the communication commands for the slave readers/writers 100 from the PC 300, the reader/writer 100A transfers the communication commands to the readers/writers 100 specified in the identification information.

Upon receiving the communication command, each reader/writer 100 attempts to communicate with the RF tag by outputting a communication signal and notifies the PC 300 of a communication result with the RF tag. Specifically, the slave readers/writers 100 send the communication results to the master reader/writer 100A. The reader/writer 100A transfers the received communication results to the PC 300. The communication result includes whether the RF tag is successfully detected, the ID code at the time when the RF tag is successfully detected, and the reception level of the signal transmitted from the RF tag.

Through the above process, the PC 300 periodically and repetitively receives the communication results in the predetermined measurement period T (test period) from each respective readers/writers 100. The PC 300 stores the chronological data representing the reception levels of the signals received by each readers/writers 100 in the predetermined measurement period T in each respective readers/writers 100. In addition, with acquisition of the communication results as a trigger, the PC 300 successively updates a waveform of a graph displayed on the display 357 of the PC 300.

In the following, the reader/writer 100A is also referred to as "R/W#0", and the reader/writer 100B is also referred to as "R/W#1". In addition, the reader/writer 100C is also referred to as "R/W#2", and the reader/writer 100D as "R/W#3".

Also, for the ease of description, the following description will focus on the four readers/writers 100A, 100B, 100C, and 100D, among the readers/writers 100.

Figure 7:
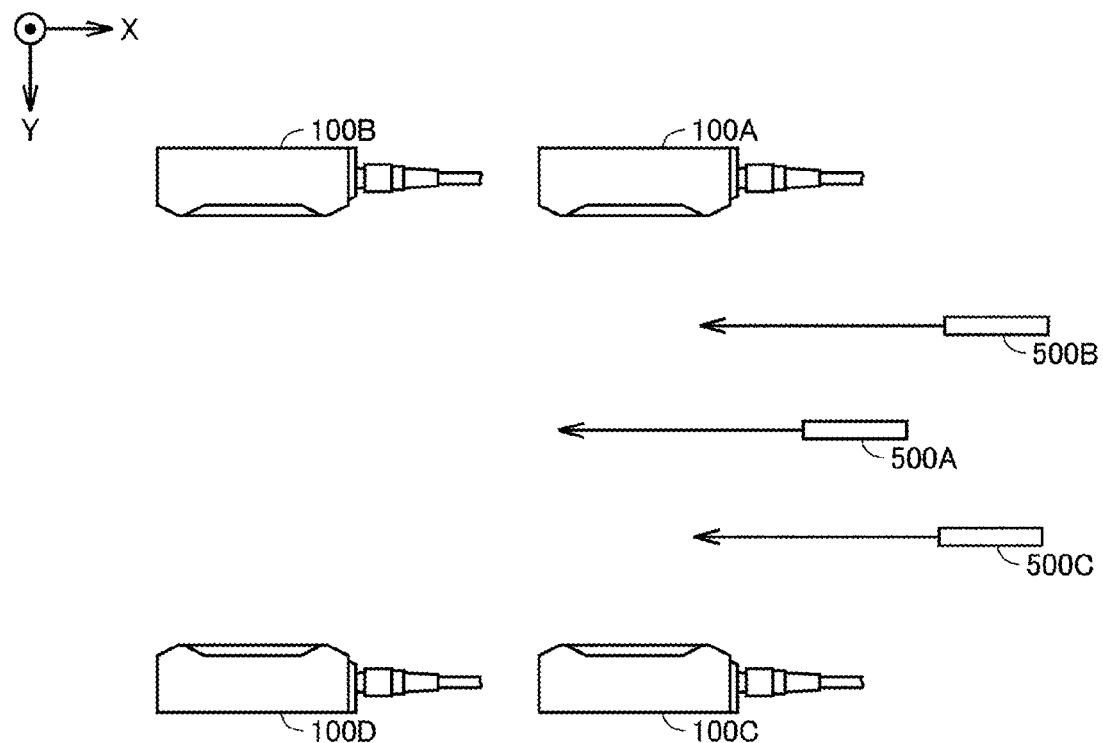
FIG. 7 is a view showing a position relation between four readers/writers.

FIG. 7 is a view showing a position relation between the readers/writers 100A, 100B, 100C, and 100D.

Referring to FIG. 7, the readers/writers 100A and 100B are installed apart from each other in a movement direction (a direction indicated by the arrows) of RF tags 500A, 500B and 500C. Similarly, the readers/writers 100C and 100D are installed apart from each other in the movement direction (the direction indicated by the arrows) of the RF tags 500A, 500B, and 500C. In addition, the readers/writers 100A and 100C are installed to be opposite to each other. Likewise, the readers/writers 100B and 100D are installed to be opposite to each other. The RF tags 500A, 500B and 500C are tags attached to the baggage items 700 shown in FIG. 5.

The PC 300 stores the chronological data DA representing the reception level of the signal received by the reader/writer 100A in the predetermined measurement period T. In addition, the PC 300 stores the chronological data DB representing the reception level of the signal received by the reader/writer 100B. Furthermore, the PC 300 stores chronological data DC representing a reception level of a signal received by the reader/writer 100C in the measurement period T and chronological data DD representing a reception level of a signal received by the reader/writer 100D in the measurement period T.

Specifically, each of the chronological data DA, DB, DC and DD includes chronological data for the respective RF tags. For example, the chronological data DA includes chronological data DA_1 of the RF tag 500A, chronological data DA_2 of the RF tag 500B, and chronological data DA_3 of the RF tag 500C. The chronological data DB includes chronological data DB_1 of the RF tag 500A, the chronological data DB_2 of the RF tag 500B, and chronological data DB_3 of the RF tag 500C. In each of the chronological data DA, DB, DC, and DD, the reception level at the time of communication with each of the RF tags is recorded in association with the RF tag identification information.

It is possible for the user to use the PC 300 to select which of the four reader/writers 100A to 100D is to be operated to carry out the measurement (test). For example, the four reader/writers 100A to 100D may all be operated for testing, or three of the readers/writers 100 may be operated for testing. The number and combination of the readers/writers to be operated for testing are not particularly limited.

With regard to generation of the chronological data DZ, in a case where testing is carried out by operating all of the four reader/writers 100A to 100D, for example, the PC 300 performs the following process.

The PC 300 specifies the highest reception level of the reception levels of the signals at the respective readers/writers 100A to 100D corresponding to the time elapsed from the start time (t=0) of the measurement period T in the chronological data DA, DB, DC, and DD at every elapsed time from the start time for each of the RF tags, and generates the chronological data DZ representing the specified reception level. In other words, the PC 300 selects the maximum value at the corresponding time (for example, at the same time) for each of the RF tags, and generates the chronological data composed of the selected value.

More specifically, the PC 300 generates the chronological data DZ including chronological data DZ_1 associated with the RF tag 500A, chronological data DZ_2 associated with the RF tag 500B, and chronological data DZ_3 associated with the RF tag 500C based on the communication results of the four readers/writers 100A to 100D.

The chronological data DZ may be generated after the measurement period T ends. Alternatively, the latest chronological data DZ may be generated with updating of all of the chronological data DA, DB, DC, and DD as a trigger. That is, as described above, the chronological data DZ may be updated as time elapses.

For example, in a case where testing is carried out by operating all of the three reader/writers 100A, 100B, and 100C, the PC 300 performs the following process.

The PC 300 specifies the highest reception level of the reception levels of the signals at the readers/writers 100A to 100C corresponding to the time elapsed from the start time (t=0) of the measurement period T in the chronological data DA, DB, and DC at every elapsed time from the start time for each of the RF tags, and generates the chronological data DZ representing the specified reception level. In other words, the PC 300 selects the maximum value at the corresponding time (for example, at the same time) for each of the RF tags, and generates chronological data composed of the selected value.

More specifically, the PC 300 generates the chronological data DZ including the chronological data DZ_1 associated with the RF tag 500A, the chronological data DZ_2 associated with the RF tag 500B, and the chronological data DZ_3 associated with the RF tag 500C based on the communication results of the three readers/writers 100A to 100C.

Also, in this case, the chronological data DZ may be generated after the measurement period T ends. Alternatively, the latest chronological data DZ may be generated with updating of all of the chronological data DA, DB, and DC as a trigger.

B. USER INTERFACE

Figure 8:
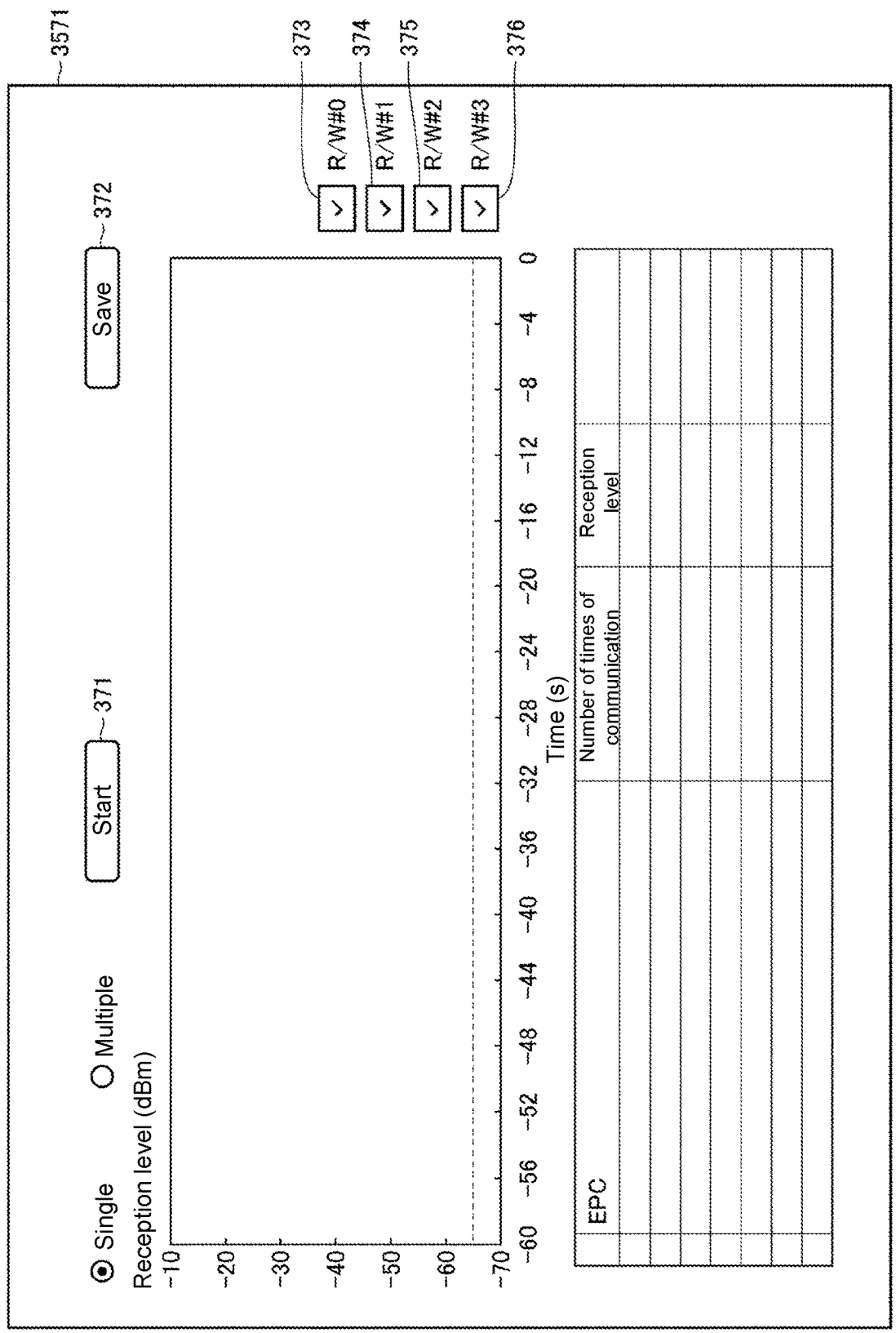
FIG. 8 is a view showing an example of a screen displayed on a display of a PC.

FIG. 8 is a view showing an example of a screen displayed on the display 357 of the PC 300.

Referring to FIG. 8, the PC 300 displays a screen 3571 on the display 357. The screen 3571 at least includes a measurement start button 371, a save button 372, and a plurality of check boxes 373 to 376.

The user selects the readers/writers 100 to be operated by using the check boxes 373 to 376. After selecting the reader/writer 100 to be operated, the user presses the measurement start button 371 to start the communication that uses the selected reader/writer 100. After the measurement is completed, the user presses the save button 372 to save the communication result in the PC 300.

Upon receiving a predetermined user operation, the PC 300 displays a screen showing the measurement result on the display 357. An example of displaying the measurement results when the four readers/writers 100A to 100D are operated is described in the following. Namely, the following describes display processing after the save button 372 is pressed.

Figure 9:
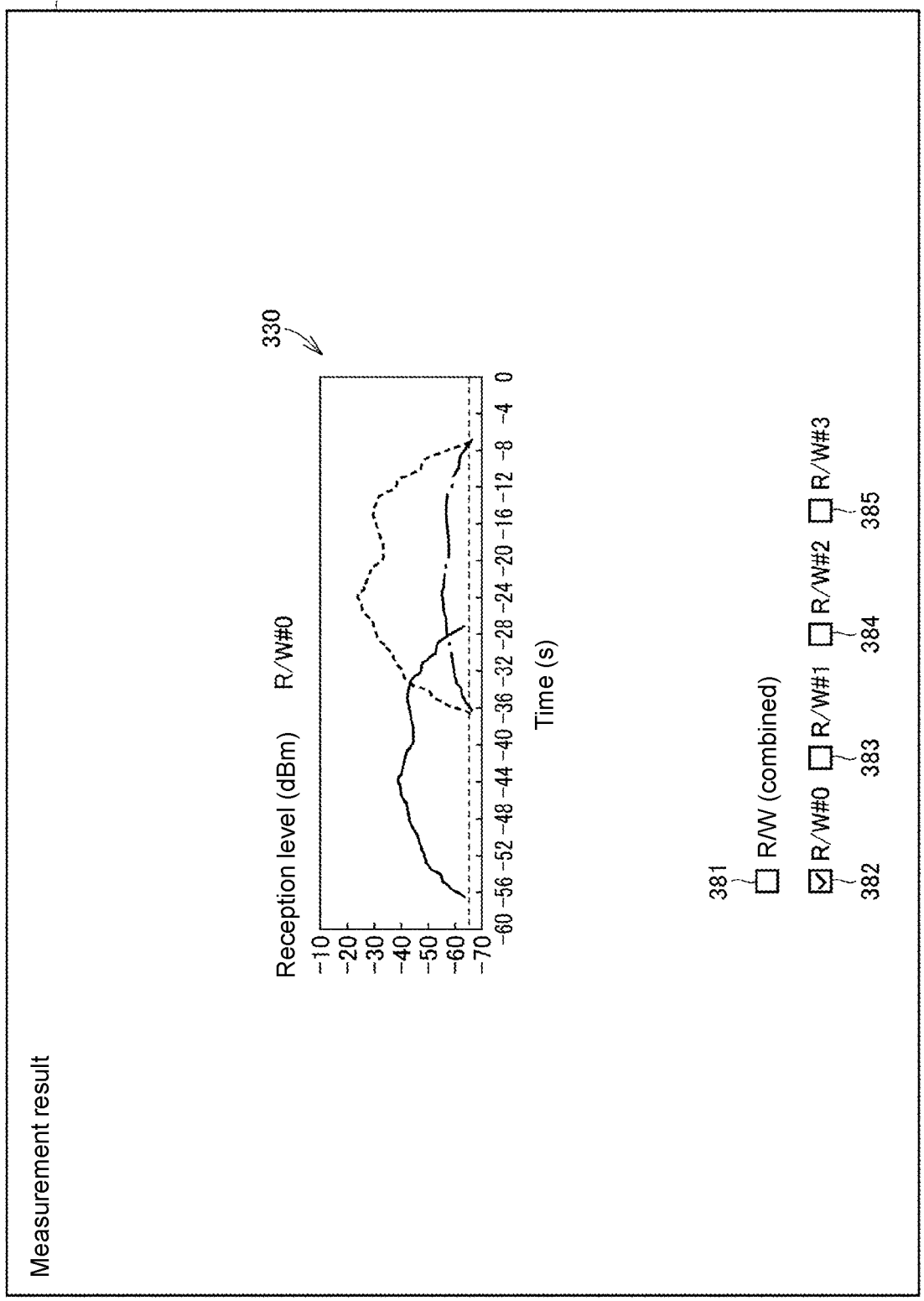
FIG. 9 is a view showing a first example of displaying measurement results.

FIG. 9 is a view showing a first example of displaying measurement results. Referring to FIG. 9, in an aspect, the PC 300 displays a screen 3572 showing the measurement results from the master reader/writer 100A on the display 357. Typically, the measurement results are displayed as a graph 330 where the horizontal axis represents the time elapsed after the measurement starts and the vertical axis represents the reception level of the signal.

The screen 3572 includes a plurality of check boxes 381 to 385. Since the graph 3572 is in the state of showing the measurement results from the reader/writer 100A, the check box 382 corresponding to the reader/writer 100A is checked.

Since the reader/writer 100A communicates with the three RF tags 500A, 500B, and 500C, three waveforms are obtained. The waveform (graph component) to the left of the graph 330 corresponds to the RF tag 500A (as shown in FIG. 7). Also, the waveform on the upper right corresponds to the RF tag 500B, and the waveform on the lower right corresponds to the RF tag 500C. Typically, the waveforms are colored differently for distinguishing the RF tags. A legend (not shown) for indicating which waveform corresponds to which RF tag is also displayed on the screen.

Figure 10:
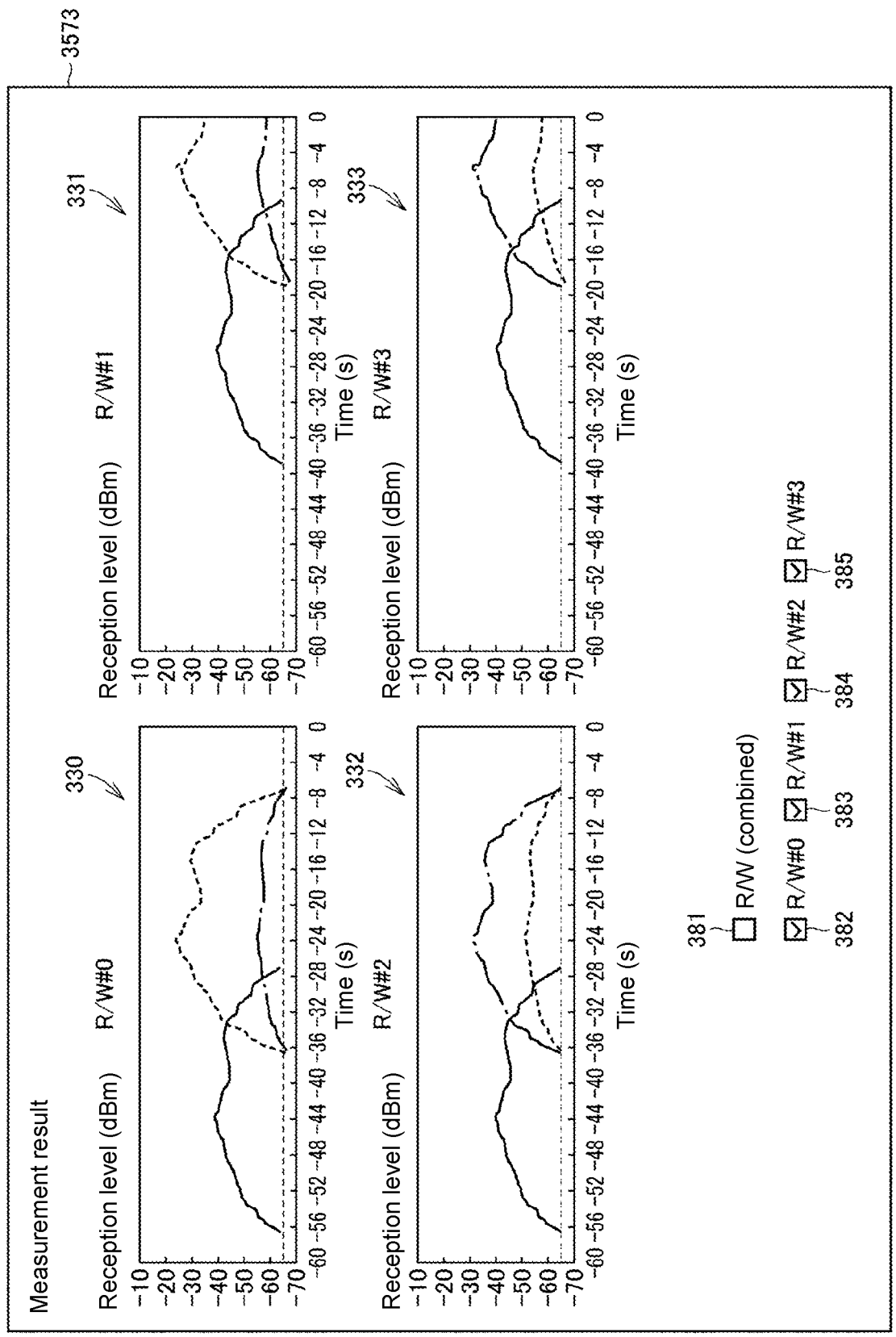
FIG. 10 is a view showing a second example of displaying measurement results.

FIG. 10 is a view showing a second example of displaying measurement results. Specifically, FIG. 10 is a view showing a screen 3573 displayed when the four check boxes 382 to 385 are checked.

Referring to FIG. 10, the PC 300 displays the measurement result from the master reader/writer 100A and the measurement results of the three slave readers/writers 100B, 100C, and 100D on the display 357.

Since each of the readers/writers 100 communicates with the three RF tags 500A, 500B, and 500C, three waveforms are obtained in each of the readers/writers 100. In each of the four graphs 330 to 333, the waveform to the left corresponds to the RF tag 500A. In the two graphs 330 and 331 on the upper side (the measurement results of the readers/writers 100A and 100B), the waveform on the upper right corresponds to the RF tag 500B and the waveform on the lower right corresponds to the RF tag 500C. In the two graphs 332 and 333 on the lower side (the measurement results of the readers/writers 100C and 100D), the waveform on the upper right corresponds to the RF tag 500C and the waveform on the lower right corresponds to the RF tag 500B.

Figure 11:
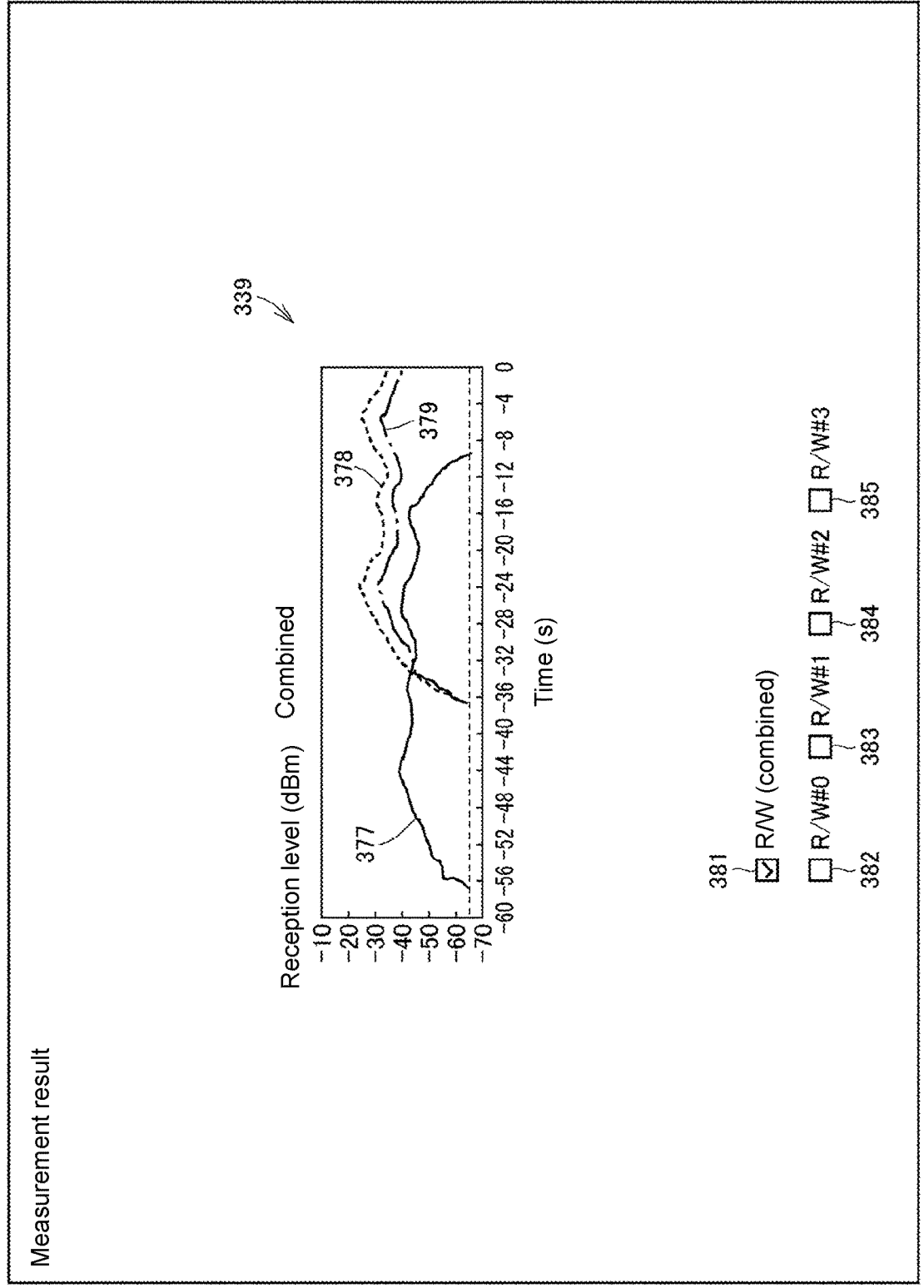
FIG. 11 is a view showing a third example of displaying measurement results.

FIG. 11 is a view showing a third example of displaying measurement results. Specifically, FIG. 11 is a view showing a screen 3574 displayed when the check box 381 is checked.

Referring to FIG. 11, the PC 300 graphically displays the chronological data DZ generated with use of the chronological data DA, DB, DC, and DD. As described above, the chronological data DZ includes the chronological data DZ_1 associated with the RF tag 500A, the chronological data DZ_2 associated with the RF tag 500B, and the chronological data DZ_3 associated with the RF tag 500C.

Therefore, the PC 300 displays a graph including a waveform 377 based on the chronological data DZ_1 associated with the RF tag 500A, a waveform 378 based on the chronological data DZ_2 associated with the RF tag 500B, and a waveform 379 based on the chronological data DZ_3 associated with the RF tag 500C. In other words, the PC displays a graph 339 including three waveforms (graph components).

Figure 12:
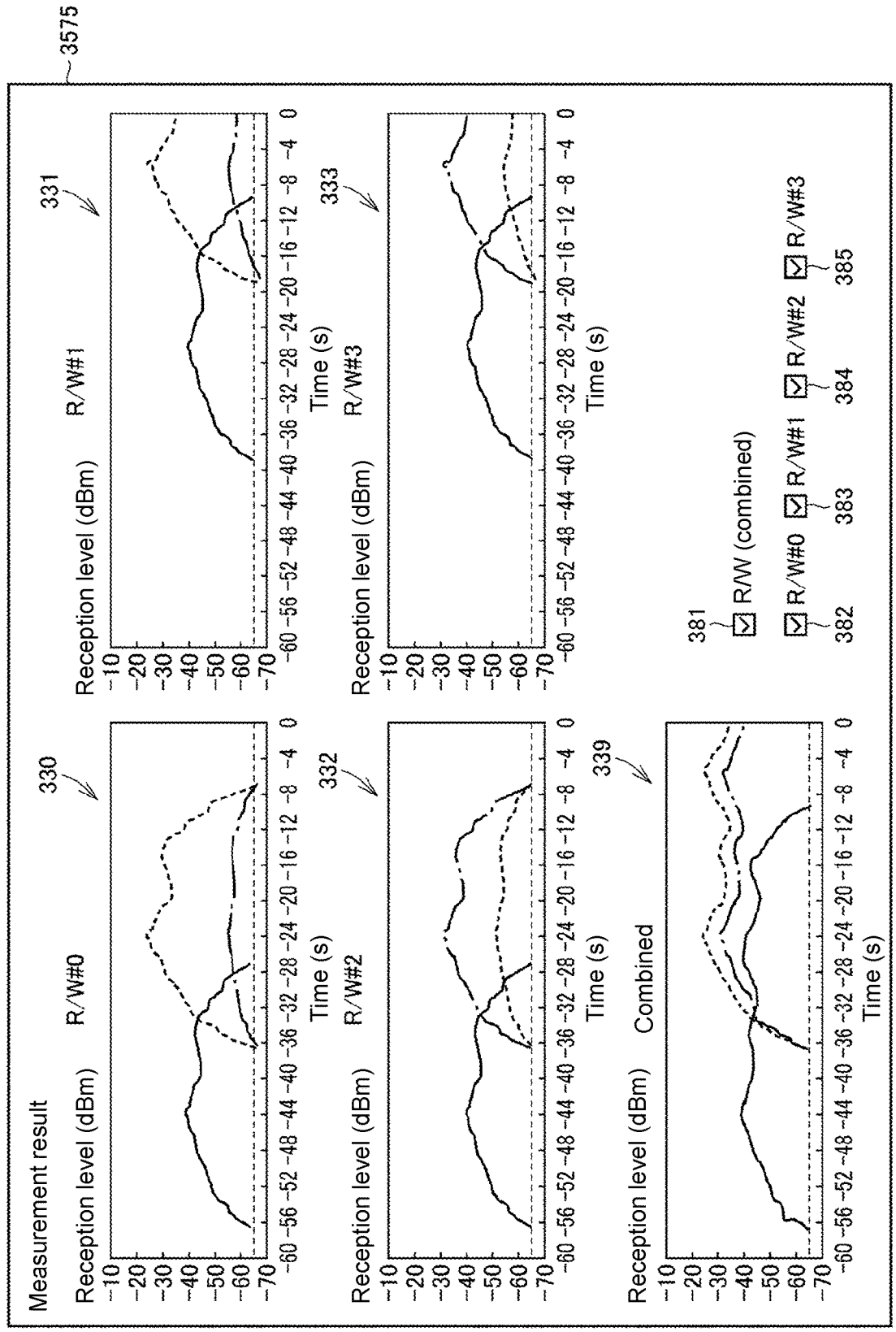
FIG. 12 is a view showing a fourth example of displaying measurement results.

FIG. 12 is a view showing a fourth example of displaying measurement results. Specifically, FIG. 12 is a view showing a screen 3575 displayed when all of the check boxes 381 to 385 are checked. Referring to FIG. 12, the PC 300 collectively displays the four graphs shown in FIG. 10 and the graph shown in FIG. 11 on one screen.

As described above, in the PC 300, it is possible to selectively display the graphs 330 to 333 and 339, and it is also possible to display all of the graphs 330 to 333 and 339 at the same time.

By displaying in this way, the user of the RFID system 1 is able to separately learn the values and the transitions of the reception levels of the readers/writers 100 by viewing the four graphs 330 to 333. Furthermore, by viewing the combined graph 339, the user is also able to learn the values and the transitions of the reception levels at the time when the RF tags 500A to 500C are under detection by the four readers/writers 100.

Therefore, the five graphs 330 to 333 and 339 may serve as a guideline for the user to change the installation positions of the readers/writers 100. By repetitively changing the installation positions of the readers/writers 100 and measuring the reception levels, the user is able to find suitable installation positions of the readers/writers 100.

C. ADJUSTMENT TO INSTALLATION

Figure 13A:
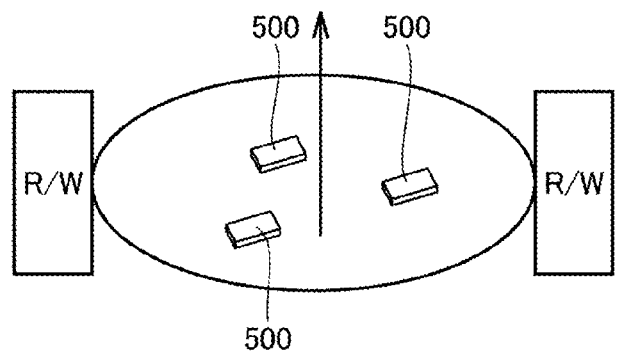
FIGS. 13(A) to 13(C) are views demonstrating adjustment to positions of readers/writers arranged opposite to each other.
Figure 13B:
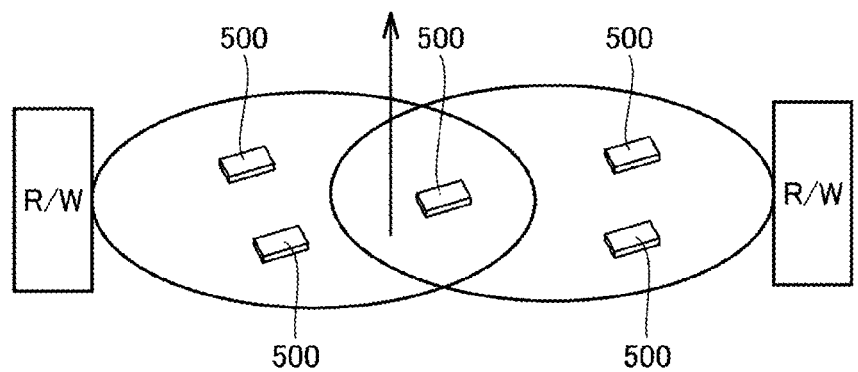
Figure 13C:
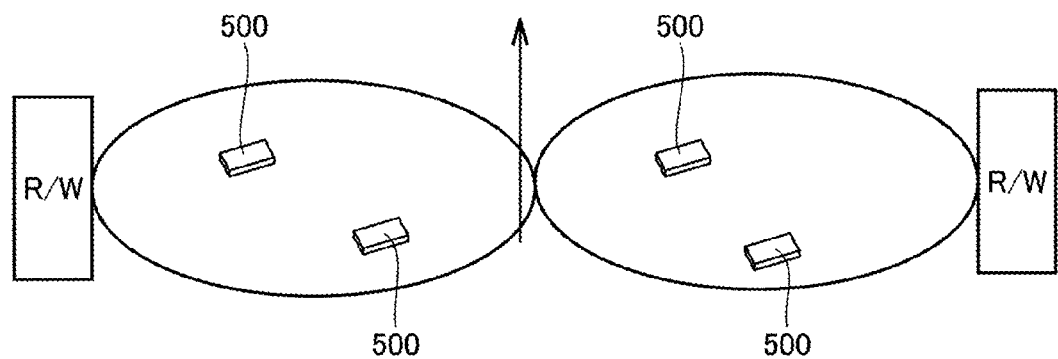

FIGS. 13(A) to 13(C) are views demonstrating adjustment to the positions of the readers/writers 100 arranged opposite to each other.

There are occasions where radio waves may be canceled out by reflection due to the surrounding environment. In such occasions, a point (null point) where the RF tag is not readable is present. Therefore, the reading ranges of the readers/writers may be arranged to overlap each other, so as to make up for the null point and thereby improve the reading accuracy at the location of the null point.

Referring to FIGS. 13(A) to 13(C), an installation pattern shown in FIG. 13(A) represents a case where the reading ranges of the readers/writers (R/W) on both sides of the RF tags 500 completely overlap each other, an installation pattern shown in FIG. 13(B) represents a case where the reading ranges of the readers/writers on both sides of the RF tags 500 partially overlap each other, and an installation pattern shown in FIG. 13(C) represents a case where the reading ranges of the readers/writers on both sides of the RF tags 500 do not overlap each other. In all of the installation patterns, the RF tags 500 move in a direction indicated by the arrow in the drawing.

The reading accuracy increases in the order from the installation pattern shown in FIG. 13(C) to the installation pattern shown in FIG. 13(B) and then to the installation pattern shown in FIG. 13(A). Therefore, wherever feasible, the user adjusts an interval between the readers/writers installed opposite to each other to make the reading ranges of the readers/writers on both sides overlap as much as possible. For example, in the case of FIG. 7, the interval between the reader/writer 100A and the reader/writer 100C and the interval between the reader/writer 100B and the reader/writer 100D are adjusted.

Figure 14A:
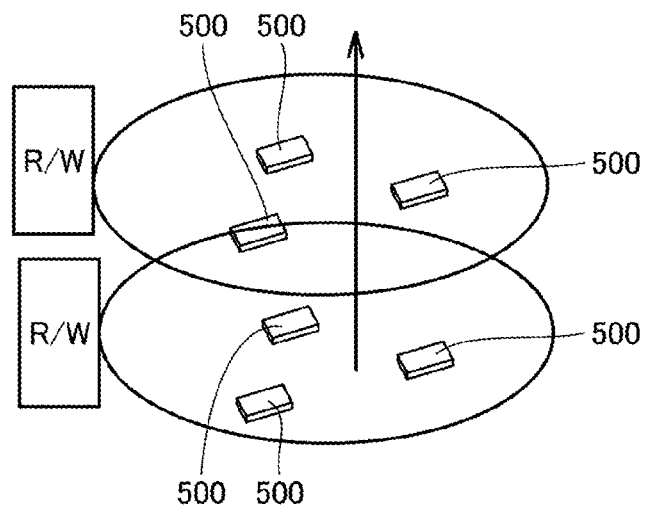
FIGS. 14(A) and 14(B) are views demonstrating adjustment to positions of readers/writers arranged along a movement direction of RF tags.
Figure 14B:
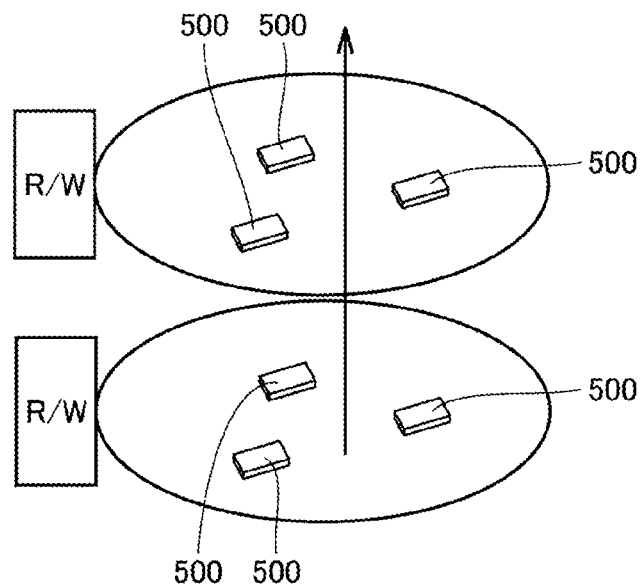

FIGS. 14(A) and 14(B) are views demonstrating adjustment to the positions of the readers/writers 100 arranged along the movement direction of the RF tags 500.

If the RF tag 500 moves at a high speed, the time during which the RF tags 500 stay within the readable range is shortened. Therefore, the chance for the RF tags 500 and the reader/writer 100 to communicate with each other is lower, and the reading accuracy drops. By expanding the reading range in the movement direction of the RF tag 500, the time during which the RF tags 500 stay within the readable range is increased.

Referring to FIGS. 14(A) and 14(B), an installation pattern shown in FIG. 14(A) represents a case where the reading ranges of the readers/writers partially overlap, and an installation pattern shown in FIG. 14(B) represents a case where the reading ranges of the readers/writers do not overlap. In both of the installation patterns, the RF tags 500 move in the direction indicated by the arrow in the drawing.

The RF tags stay in the readable range longer in the installation pattern shown in FIG. 14(B) than in the installation pattern shown in FIG. 14(A). Therefore, the installation pattern shown in FIG. 14(B) has higher reading accuracy than the installation pattern shown in FIG. 14(A).

Therefore, wherever feasible, the user adjusts the interval between the readers/writers in the movement direction of the RF tags 500 to make the reading ranges of the readers/writers arranged along the movement direction of the RF tags 500 overlap at little as possible. For example, in the case of FIG. 7, an interval between the reader/writer 100A and the reader/writer 100B and an interval between the reader/writer 100C and the reader/writer 100D are adjusted.

<Device Configuration>

Figure 15:
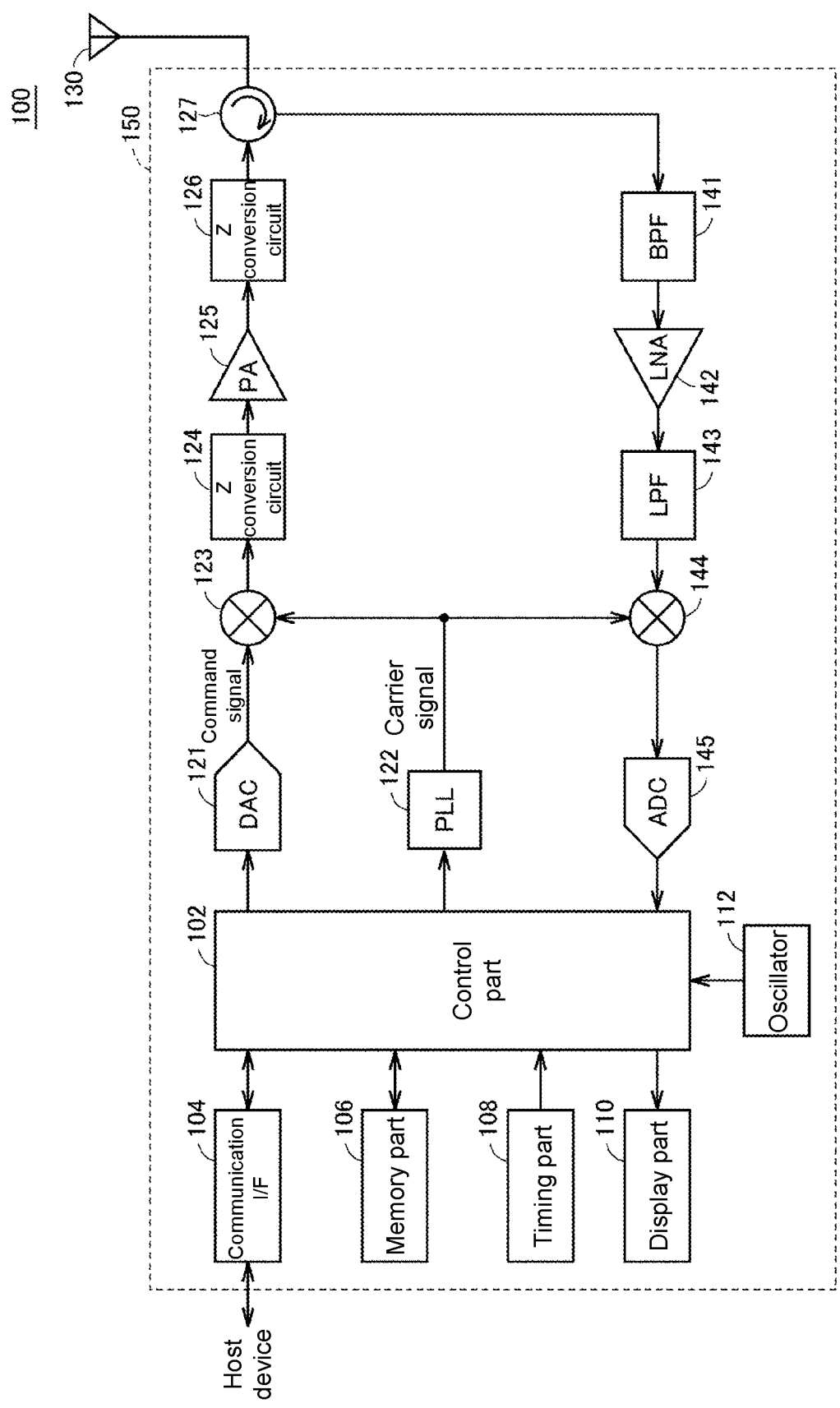
FIG. 15 is a schematic diagram showing an example of a hardware configuration of a reader/writer forming an RFID system.

FIG. 15 is a schematic diagram showing an example of a hardware configuration of the reader/writer 100 that constitutes the RFID system 1A according to the embodiment. Referring to FIG. 15, the reader/writer 100 includes a communication control part 150 and an antenna 130, and the communication control part 150 includes a control part 102. FIG. 15 illustrates an example of a configuration where the antenna 130 is provided separately from the communication control part 150. However, the antenna 130 and the communication control part 150 may also be integrated.

In addition to the control part 102, the communication control part 150 further includes a communication interface (I/F) 104, a memory part 106, a timing part 108, a display part 110, and an oscillator 112.

The control part 102 is an arithmetic processing part that controls various processes in the reader/writer 100, and is typically implemented by execution of a program performed by a processor, such as a central processing unit (CPU). Alternatively, all or part of the control part 102 may be implemented with use of hardware such as an application specific integrated circuit (ASIC) or a field-programmable gate array (FPGA).

The communication interface 104 is equivalent to a communication part for exchanging data with a host device (the PLC 200 or the PC 300). In the RFID system 1A, the communication interface 104 is at least capable of responding to the host device with data from the reader/writer 100. The communication interface 104 may be any communication means such as the Ethernet (registered trademark), serial communication, universal serial bus (USB) communication, parallel communication, or various field buses.

The memory part 106 stores various programs to be executed by the control part 102, the measurement data collected from the RF tags 500, and the like. In the RFID system 1A, since identification information has been set in advance for the RF tags 500 that exchanges data with the reader/writer 100, an identification information list for specifying such identification information is stored in the memory part 106. By referring to the identification information list, various command signals described in the following are generated.

The timing part 108 may be a clock or a timer, and provides a timing signal to the control part 102. The display part 110 displays various information according to an instruction from the control part 102.

The oscillator 112 generates a synchronization signal for operating the control part 102. The communication control part 150 is equivalent to a communication part that communicates with the RF tags 500 in a non-contact manner. The communication control part 150 generates electromagnetic waves for reading the measurement data from the RF tags 500 and decodes response signals from the RF tags 500 to output decoding results. The electromagnetic waves may have frequencies that fall within the ultra high frequency (UFH) band. Nevertheless, the electromagnetic waves may also be in other frequency bands.

More specifically, the communication control part 150 includes a digital-to-analog converter (DAC) 121, a phase locked loop (PLL) 122, mixers 123 and 144, a pair of Z conversion circuits 124 and 126 sandwiching a power amplifier (PA) 125, a separation circuit 127, a band pass filter (BPF) 141, a low noise amplifier (LNA) 142, a low pass filter (LPF) 143, and an analog-to-digital converter (ADC) 145 as main components.

In the following, the operations of the respective parts for realizing the communication processing between the reader/writer 100 and the RF tag 500 are described.

Firstly, the PLL 122 receives an activation command from the control part 102 and outputs a high frequency pulse (hereinafter also referred to as "carrier signal") as a carrier wave source. The carrier signal from the PLL 122 is used for modulation and demodulation. In other words, the carrier signal from the PLL 122 is provided to the mixer 123 and the mixer 144.

When a predetermined condition is satisfied, the control part 102 outputs a command signal with a predetermined number of bits. The command signal is an instruction for the RF tag 500, and is superimposed on the carrier signal to be supplied to the RF tag 500. The command signal from the control part 102 is converted into an analog signal by the DAC 121, and then is subjected to frequency conversion (up-conversion) to a wireless signal frequency band by the carrier signal from the PLL 122 at the mixer 123.

The command signal subjected to frequency conversion by the mixer 123 goes through the impedance matching process performed by the Z conversion circuits 124 and 126 and the amplification process performed by the PA 125, and is supplied to the antenna 130 via the separation circuit 127, so as to be transmitted as an electromagnetic wave for the RF tag 500. Accordingly, the reader/writer 100 has a transmission function of transmitting a command signal to one or more RF tags 500.

In the RF tag 500 that comes within a receivable range of the electromagnetic wave transmitted from the reader/writer 100, an induced electromotive force is generated internally due to the received electromagnetic wave, and various circuits inside the RF tag 500 (details will be described in the following) are activated by the induced electromotive force. When receiving the command signal superimposed on the carrier wave in this state, the control part of the RF tag 500 decodes the received command signal, carries out processing according to contents of the command obtained through decoding, generate a response signal including a processing result, and then respond to the reader/writer 100.

The response signal from the RF tag 500 is received by the antenna 130 and input to the BPF 141 by the separation circuit 127. The received response signal is amplified by the LNA 142 after noise included in the received response signal is removed by the BPF 141. In addition, the response signal amplified by the LNA 142 is input to the mixer 144 after a high frequency component is removed by the LPF 143. In the mixer 144, the response signal is subjected to frequency conversion (down-conversion) to a frequency band of a baseband signal by the carrier signal from the PLL 122. Moreover, the response signal after the frequency conversion is converted into a digital signal by the ADC 145, and then input to the control part 102. That is, the communication result including measurement data obtained by decoding the response signal from the RF tag 500 is input to the control part 102. Furthermore, the control part 102 may output to the communication interface 104 the communication result including the measurement data obtained by decoding.

Figure 16:
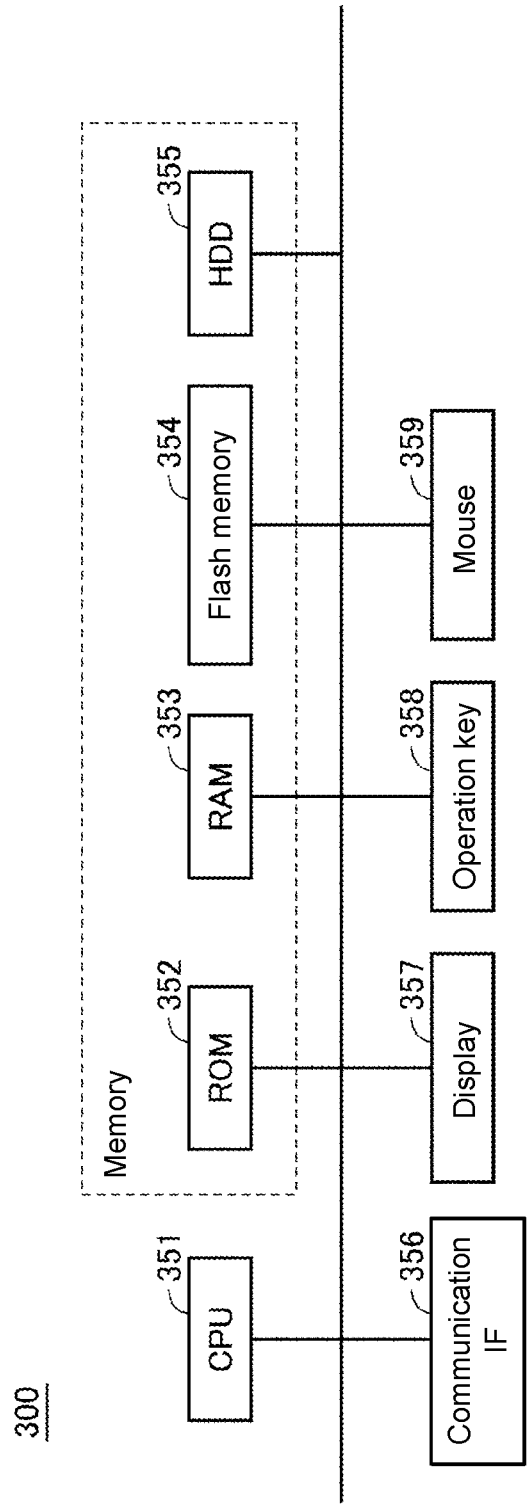
FIG. 16 is a schematic diagram showing a hardware configuration of a PC.

The communication interface 104 responds to the host device with the communication result from the control part 102. FIG. 16 is a schematic diagram showing a hardware configuration of the PC 300. Referring to FIG. 16, the PC 300 is typically configured with a general-purpose computer.

The PC 300 includes a CPU 351 for executing various programs including an operating system (OS), a read only memory (ROM) 352 for storing BIOS and various data, a RAM 353 providing a work area for storing data required for executing the programs at the CPU 351, a flash memory 354 non-volatilely storing the programs to be executed by the CPU 351, and a hard disk drive (HDD) 355.

The PC 300 further includes an operation key 358 and a mouse 359 for receiving operations from the user, and the display 357 presenting various kinds of information to the user. Moreover, the PC 300 includes a communication interface (IF) 356 for communicating with the PLC 200 and the like.

An application (software) for processing the aforementioned data and for displaying a screen is installed in the PC 300. By executing a program of the application, the PC 300 is able to display a screen, etc., including various graphs described above.

As described above, the PC 300 is implemented with a general-purpose computer. Therefore, no further details in this regard will be described.

Figure 17:
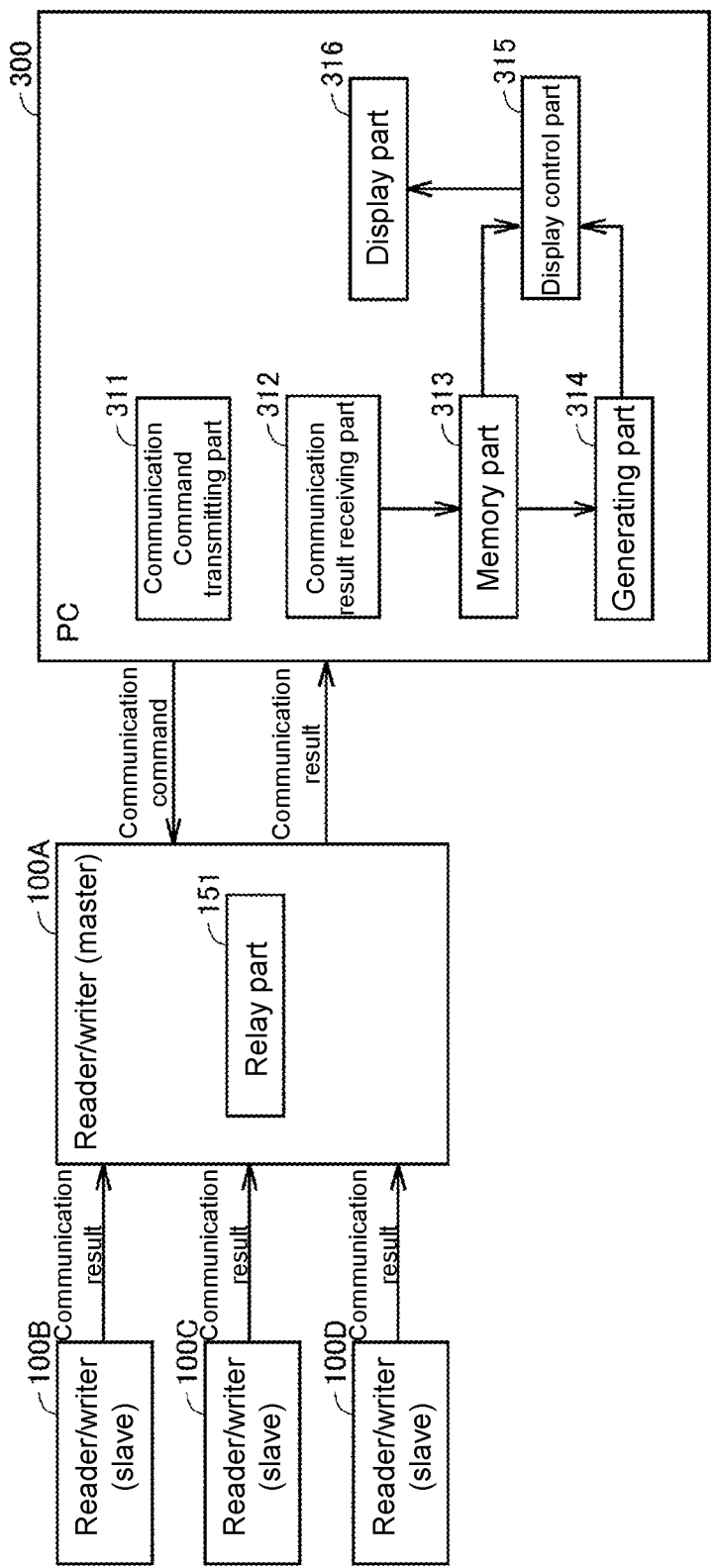
FIG. 17 is a block diagram demonstrating a functional configuration of a reader/writer and a PC.

FIG. 17 is a block diagram demonstrating a functional configuration of the reader/writer 100A and the PC 300.

Referring to FIG. 17, the reader/writer 100A includes a relay part 151. The PC 300 includes a communication command transmitting part 311, a communication result receiving part 312, a memory part 313, a generating part 314, a display control part 315, and a display part 316.

The communication command transmitting part 311 repetitively transmits the communication commands to the readers/writers 100, as described above. The communication commands for the readers/writers 100B, 100C, and 100D are transferred to the corresponding readers/writers 100 by the relay part 151 of the reader/writer 100A.

The communication result receiving part 312 receives the communication results from the readers/writers 100. More specifically, the communication result receiving part 312 receives the communication results of the slave readers/writers 100B to 100D via the relay part 151 of the reader/writer 100A.

As described above, the communication result includes data of whether or not the RF tag is successfully detected, the ID code at the time when the RF tag is successfully detected, and the reception level of the signal transmitted from the RF tag. The communication results are sequentially stored in the memory part 313 in association with the identification information (ID) of the readers/writers.

The data generating part 152 generates the chronological data DZ based on the chronological data DA, DB, DC, and DD stored in the memory part 106. As described above, the chronological data DZ is created by selecting the maximum value of the reception levels.

When the measurement period T elapses, the chronological data DA, DB, DC, and DD over the predetermined measurement period T are stored in the memory part 313. Also, when the measurement period T elapses, the chronological data DZ over the predetermined measurement period T is generated.

The display control part 315 updates the waveform of the graph on the screen 3571 shown in FIG. 8, with acquisition of the communication results from the respective readers/writers 100 in the measurement period T as a trigger, for example. Alternatively, the display control part 315 updates the waveform of the graph with updating of the chronological data DZ based on the communication results acquired from the respective readers/writers 10 in the measurement period T as a trigger. At which timing the waveform is updated may be determined as appropriate.

In addition, the display control part 315 displays the respective screens 3572 to 3575 shown in FIGS. 9 to 12 based on the operation of the user after the measurement period T elapses.

E. CONTROL STRUCTURE

Figure 18:
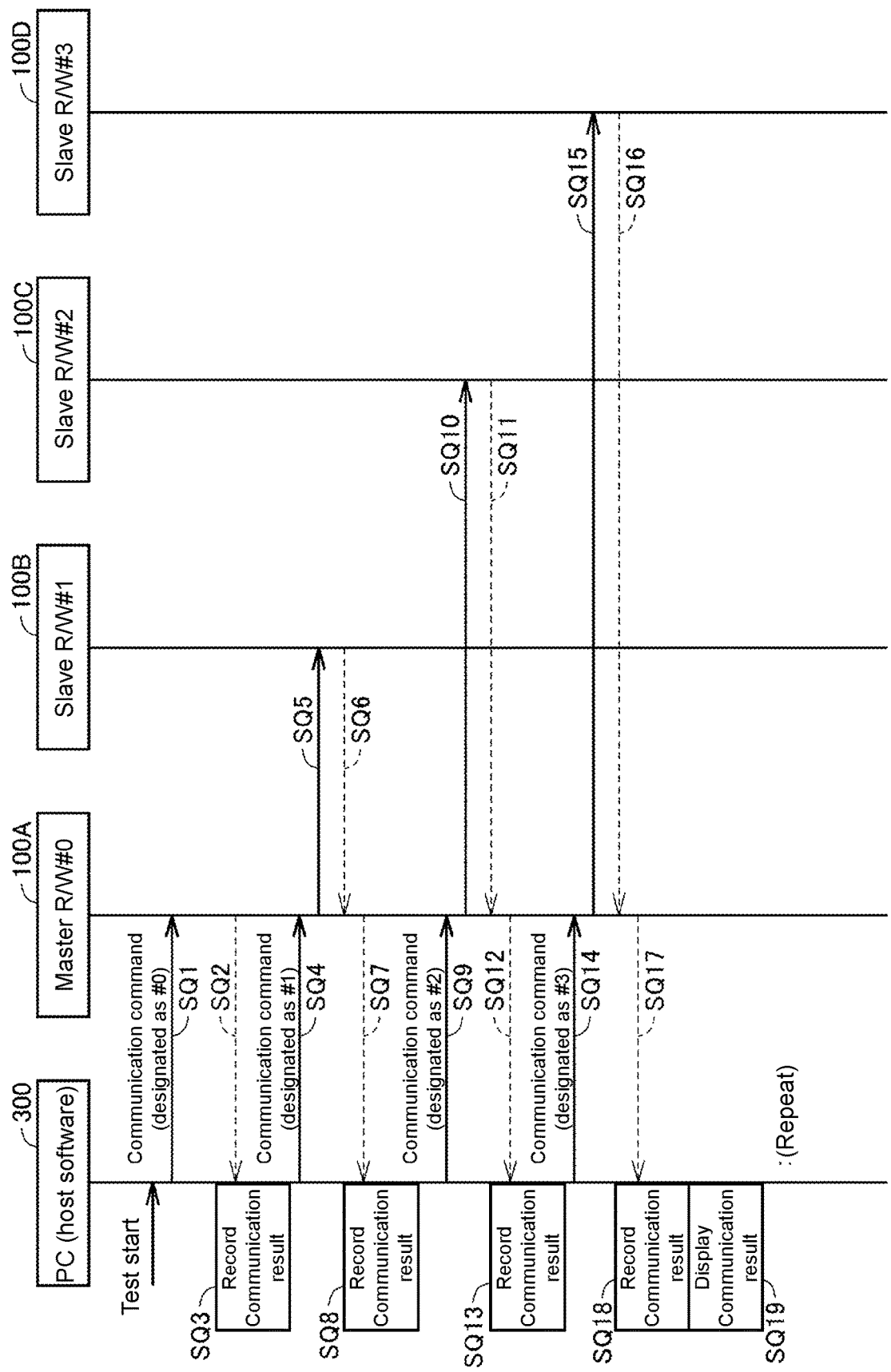
FIG. 18 is a sequence diagram showing an example of processing in an RFID system.

FIG. 18 is a sequence diagram showing an example of processing in the RFID system 1.

Referring to FIG. 18, upon receiving a user operation of starting a measurement (test), in a sequence SQ1, the PC 300 transmits a communication command (designated as No. 0) to the reader/writer 100A for enabling the reader/writer 100A to carry out communication. As a result, the reader/writer 100A attempts to communicate with the RF tag 500.

In a sequence SQ2, the reader/writer 100A transmits a communication result of the reader/writer 100A to the PC 300 as a response signal to the communication command. In a sequence SQ3, the PC 300 stores the communication result in association with the identification information of the reader/writer 100A. Accordingly, generation of the chronological data DA is started.

In a sequence SQ4, the PC 300 transmits a communication command (designated as No. 1) to the reader/writer 100A for enabling the reader/writer 100B to carry out communication. In a sequence SQ5, the reader/writer 100A transfers the communication command to the reader/writer 100B. As a result, the reader/writer 100B attempts to communicate with the RF tag 500.

In a sequence SQ6, the reader/writer 100B transmits a communication result of the reader/writer 100B to the reader/writer 100A as a response signal to the communication command. In a sequence SQ7, the reader/writer 100A transfers the communication result received from the reader/writer 100B to the PC 300. In a sequence SQ8, the PC 300 stores the communication result in association with the identification information of the reader/writer 100B. Accordingly, generation of the chronological data DB is started.

In a sequence SQ9, the PC 300 transmits a communication command (designated as No. 2) to the reader/writer 100A for enabling the reader/writer 100C to carry out communication. In a sequence SQ10, the reader/writer 100A transfers the communication command to the reader/writer 100C. As a result, the reader/writer 100C attempts to communicate with the RF tag 500.

In a sequence SQ11, the reader/writer 100C transmits a communication result of the reader/writer 100C to the reader/writer 100A as a response signal to the communication command. In a sequence SQ12, the reader/writer 100A transfers the communication result received from the reader/writer 100C to the PC 300. In a sequence SQ13, the PC 300 stores the communicate result in association with the identification information of the reader/writer 100C. Accordingly, generation of the chronological data DC is started.

In a sequence SQ14, the PC 300 transmits a communication command (designated as No. 3) to the reader/writer 100A for enabling the reader/writer 100D to carry out communication. In a sequence SQ15, the reader/writer 100A transfers the communication command to the reader/writer 100D. As a result, the reader/writer 100D attempts to communicate with the RF tag 500.

In a sequence SQ16, the reader/writer 100D transmits a communication result of the reader/writer 100D to the reader/writer 100A as a response signal to the communication command. In a sequence SQ17, the reader/writer 100A transfers the communication result received from the reader/writer 100D to the PC 300. In a sequence SQ18, the PC 300 stores the communicate result in association with the identification information of the reader/writer 100D. Accordingly, generation of the chronological data DD is started.

In a sequence SQ19, the PC 300 graphically displays the communication results received from the readers/writers 100. Hereinafter, the processes from the sequence SQ1 to the sequence SQ19 are executed until the measurement period T elapses.

The sequence SQ19 will be described in detail as follows. In a case where the sequence SQ1 to the sequence SQ19 are set as one processing cycle, the graph is updated in the sequence SQ19 by using the four communication results obtained in the same processing cycle.

In a case of a configuration for generating the chronological data DZ each time, the PC 300 specifies the maximum value of the reception levels by referring to the four communication results acquired in the same processing cycle and includes the maximum value in the chronological data DZ in the sequence SQ19. In such case, the PC 300 updates the graph every processing cycle based on the chronological data DZ.

In a case of a configuration for carrying out such data processing, "the reception levels of the signals at the readers/writers 100 corresponding to the elapsed dine from the start time (t=0) of the measurement period T" represents the communication results (the reception levels at the readers/writers 100) included in the same processing cycle.

Figure 19:
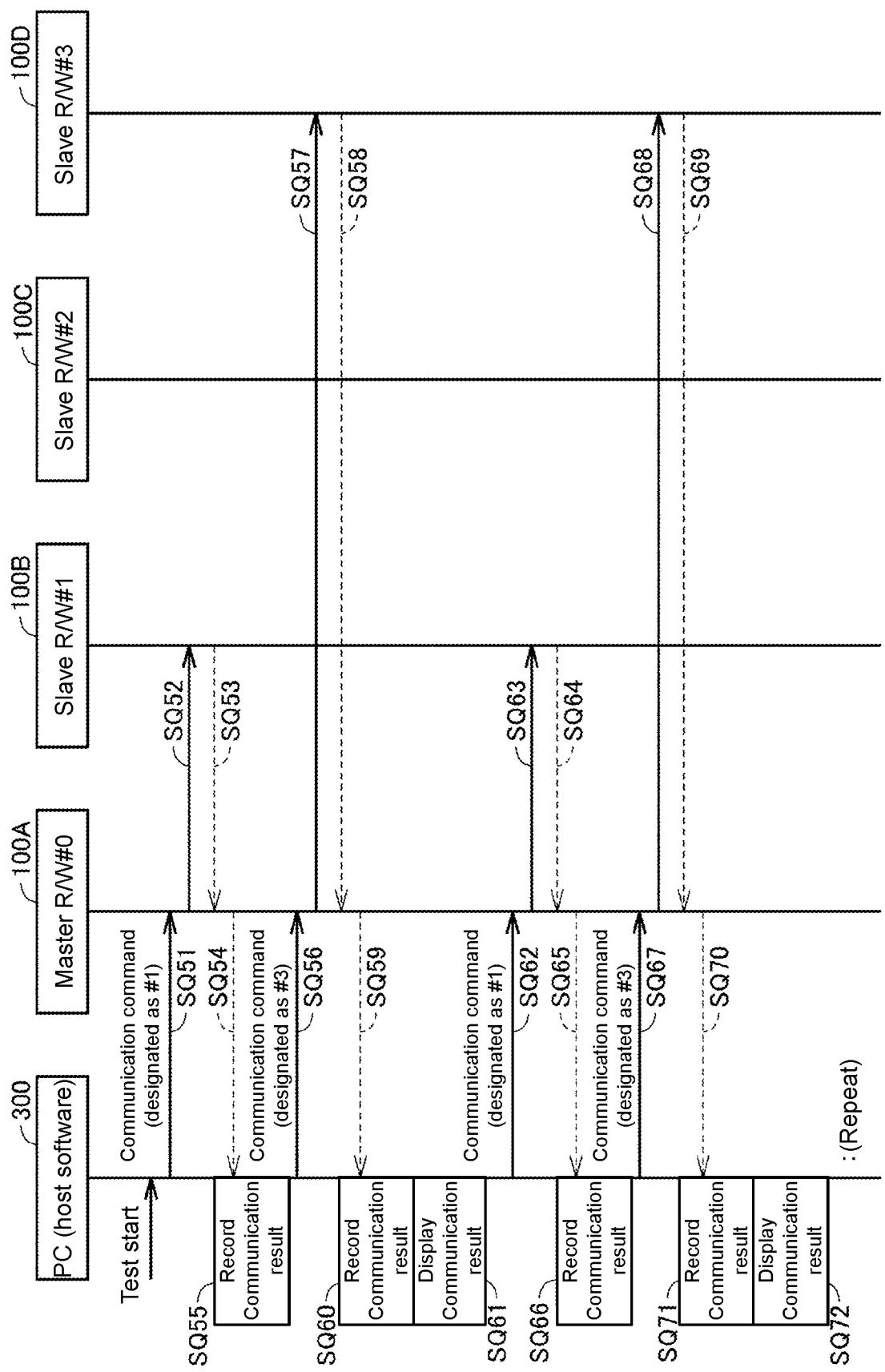
FIG. 19 is a sequence diagram showing an example of processing in an RFID system in an occasion of testing two readers/writers.

FIG. 19 is a sequence diagram showing an example of processing in the RFID system 1 in the occasion of testing the reader/writer 100B and the reader/writer 100D.

Referring to FIG. 19, upon receiving a user operation of starting a measurement (test), in a sequence SQ51, the PC 300 transmits a communication command (designated as No. 1) to the reader/writer 100A for enabling the reader/writer 100B to carry out communication. In a sequence SQ52, the reader/writer 100A transfers the communication command to the reader/writer 100B. As a result, the reader/writer 100B attempts to communicate with the RF tag 500.

In a sequence SQ53, the reader/writer 100B transmits a communication result of the reader/writer 100B to the reader/writer 100A as a response signal to the communication command. In a sequence SQ54, the reader/writer 100A transfers the communication result received from the reader/writer 100B to the PC 300. In a sequence SQ55, the PC 300 stores the communication result in association with the identification information of the reader/writer 100B. Accordingly, generation of the chronological data DB is started.

In a sequence SQ56, the PC 300 transmits a communication command (designated as No. 3) to the reader/writer 100A for enabling the reader/writer 100D to carry out communication. In a sequence SQ57, the reader/writer 100A transfers the communication command to the reader/writer 100D. As a result, the reader/writer 100D attempts to communicate with the RF tag 500.

In a sequence SQ58, the reader/writer 100D transmits a communication result of the reader/writer 100D to the reader/writer 100A as a response signal to the communication command. In a sequence SQ59, the reader/writer 100A transfers the communication result received from the reader/writer 100D to the PC 300. In a sequence SQ60, the PC 300 stores the communication result in association with the identification information of the reader/writer 100D. Accordingly, generation of chronological data DD is started.

In a sequence SQ61, the PC 300 graphically displays the communication results received from the readers/writers 100B and 100D.

Afterwards, in sequences SQ62 to SQ71, processes similar to the sequences SQ51 to SQ60 are carried out. In the sequence SQ66, the chronological data DB is updated. In the sequence SQ71, the chronological data DD is updated.

In the sequence SQ72, the PC 300 updates the graph by using the communication results recorded in the sequences SQ66 and SQ71.

Figure 20:
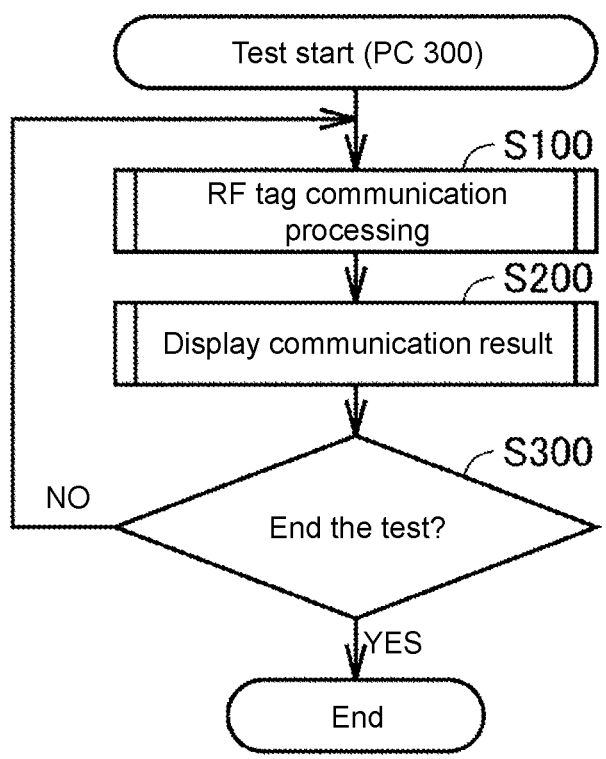
FIG. 20 is a flowchart showing a processing flow in a PC.

FIG. 20 is a flowchart showing a processing flow in the PC 300. Referring to FIG. 20, at Step S100, the PC 300 carries out communication processing with the RF tag 500. At Step S200, the PC 300 records a communication result.

At Step S300, the PC 300 determines whether the measurement (test) ends. Specifically, the PC 300 determines whether or not the measurement period T elapses. If the PC 300 determines that the test has not ended yet (NO in Step S300), the processing proceeds to Step S100. If the PC 300 determines that the test has already ended (YES in Step S300), the PC 300 terminates the series of processes.

Figure 21:
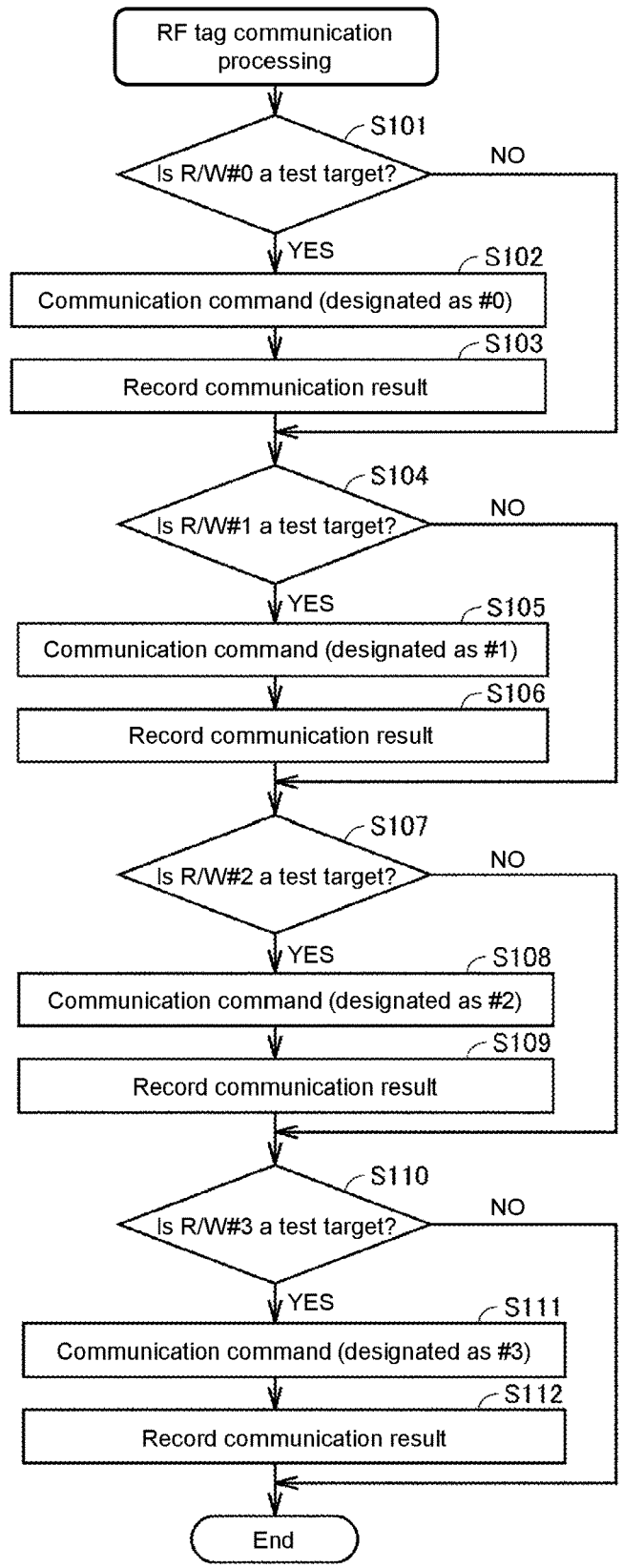
FIG. 21 is a flowchart showing an example of processes in Step S100 of FIG. 20.

FIG. 21 is a flowchart showing an example of processes in Step S100 of FIG. 20. Referring to FIG. 21, at Step S101, the PC 300 determines whether R/W#0 (specifically, the reader/writer 100A) is a test target. If the PC 300 determines that R/W#0 is a test target (YES at Step S101), the PC 300 transmits a communication command (designated as No. 0) at Step S102. At Step S103, the PC 300 records the communication result. If the PC 300 determines that R/W#0 is not a test target (NO at Step S101), the processing proceeds to Step S104.

At Step S104, the PC 300 determines whether R/W#1 (specifically, the reader/writer 100B) is a test target. If the PC 300 determines that R/W#1 is a test target (YES at Step S104), the PC 300 transmits a communication command (designated as No. 1) at Step S105. At Step S106, the PC 300 records a communication result. If the PC 300 determines that R/W#1 is not a test target (NO at Step S104), the processing proceeds to Step S107.

At Step S107, the PC 300 determines whether R/W#2 (specifically, the reader/writer 100C) is a test target. If the PC 300 determines that R/W#2 is a test target (YES at Step S107), the PC 300 transmits a communication command (designated as No. 2) at Step S108. At Step S109, the PC 300 records a communication result. If the PC 300 determines that R/W#2 is not a test target (NO at Step S107), the processing proceeds to Step S110.

At Step S110, the PC 300 determines whether R/W#3 (specifically, the reader/writer 100D) is a test target. If the PC 300 determines that R/W#3 is a test target (YES at Step S110), the PC 300 transmits a communication command (designated as No. 3) at Step S111. At Step S112, the PC 300 records a communication result. If the PC 300 determines that R/W#3 is not a test target (NO at Step S110), the PC 300 terminates the series of processes. Specifically, the PC 300 advances the processing to Step S200 in FIG. 20.

Figure 22:
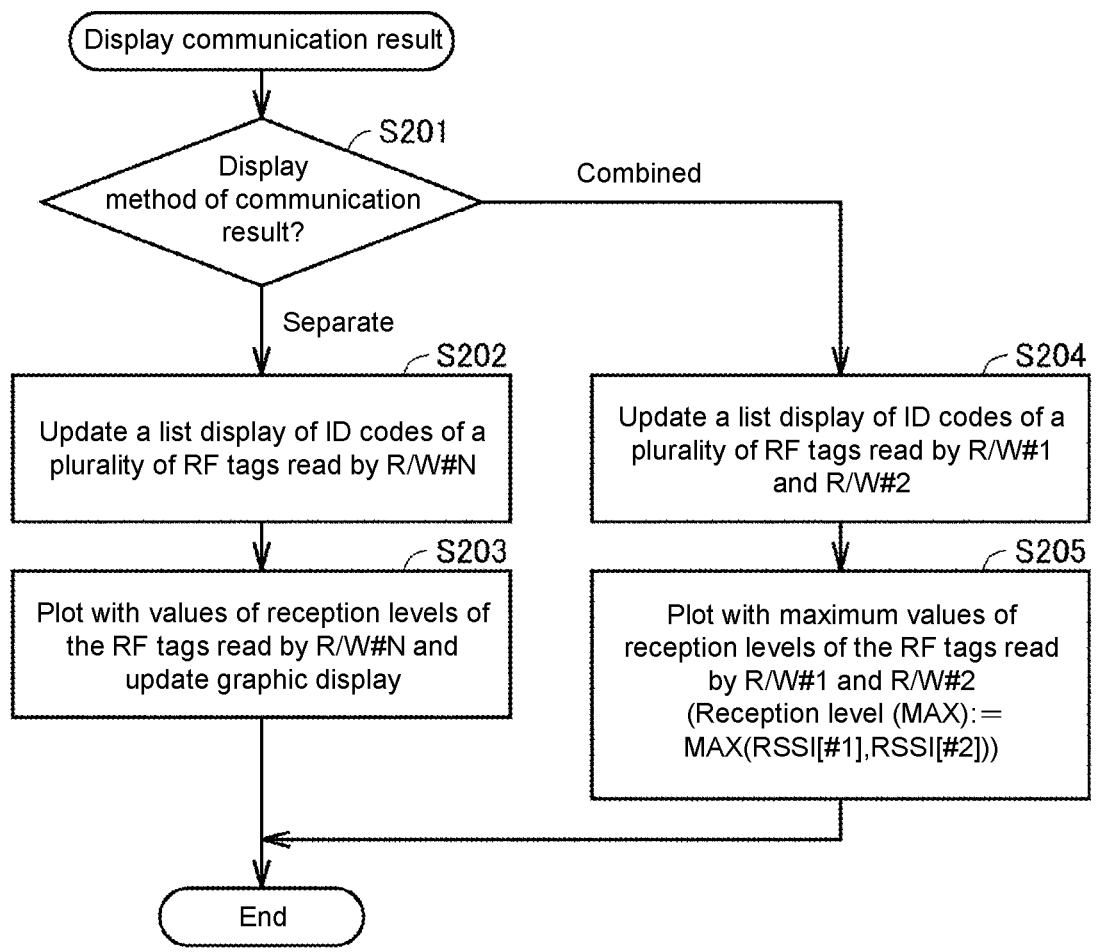
FIG. 22 is a flowchart showing an example of processes in Step S200 in FIG. 20.

FIG. 22 is a flowchart showing an example of processes in Step S200 in FIG. 20. Referring to FIG. 22, at Step S201, the PC 300 determines whether a display format of the communication result is a separate display type for the readers/writers 100 or a combined display type for the readers/writers 100. The screens 3572 and 3573 shown in FIGS. 9 and 10 are examples of the separate display type, and the screen 3574 shown in FIG. 11 is an example of the combined display type. Moreover, it is also possible to adopt a configuration in which a display type integrating the separate display type and the combined display type may be selected (see the screen 3575 in FIG. 12).

In the case of the separate display type, the PC 300 updates a list display of the ID codes of the RF tags 500 read by R/W#N (N being 0 or a natural number of 1 or more) at Step S202. At Step S203, the PC 300 plots based on the values of the reception levels of the RF tags 500 read by R/W#N, thereby updating the graphic display.

In the case of the combined display type, the PC 300 updates the list display of the ID codes of the RF tags 500 read by R/W#N at Step S204. At Step S205, the PC 300 plots with the maximum values of the reception levels of the RF tags 500 read by R/W#N, thereby updating the graphic display.

F. MODIFIED EXAMPLE (1) In the above description, the PC 300 as a host device serves as a server, and the readers/writers 100 serves as clients, for example. However, the disclosure is not limited thereto.

For example, the reader/writer 100A as the master may serve as a server in the RFID system 1 or 1A, and the PC 300 may serve as a client.

In such case, the reader/writer 100A generates the chronological data DZ or the like. Moreover, the reader/writer 100A may generate a webpage or the like for displaying the screens described above with the PC 300. The PC 300 may display the screens on the display 357, for example, by using a browser. In other words, the reader/writer 100A may carry out the functions of the communication command transmitting part 311, the communication result receiving part 312, the memory part 313, and the generating part 314.

(2) The RFID system 1 or 1A may have a server device other than the PC 300. The server device may carry out the functions of the communication command transmitting part 311, the communication result receiving part 312, the memory part 313, and the generating part 314. In such case, the PC 300 may serve as a client and display the various screens described above on the display 357 by a browser or the like.

(3) The readers/writers 100 are described above as being configured to transmit the communication results to the PC 300 every time the communication is carried out, for example, but the disclosure is not limited thereto. The readers/writers 100 may hold the communication results and transmit the communication results to the PC 300 at a predetermined timing (for example, after the measurement period T elapses), which applies even when the reader/writer 100 serves as a server.

(4) Time information (time stamp) may be given to each data component of the chronological data DA, DB, DC, and DD. In such a configuration, the corresponding data may be easily identified when the chronological data DZ is generated.

(5) A programmable display device may be used instead of the PC 300.

(6) The PC 300 may graphically display the RF tags 500 that have been read and the number thereof according to the readers/writers or the overlapping areas of the reading ranges.

Figure 23:
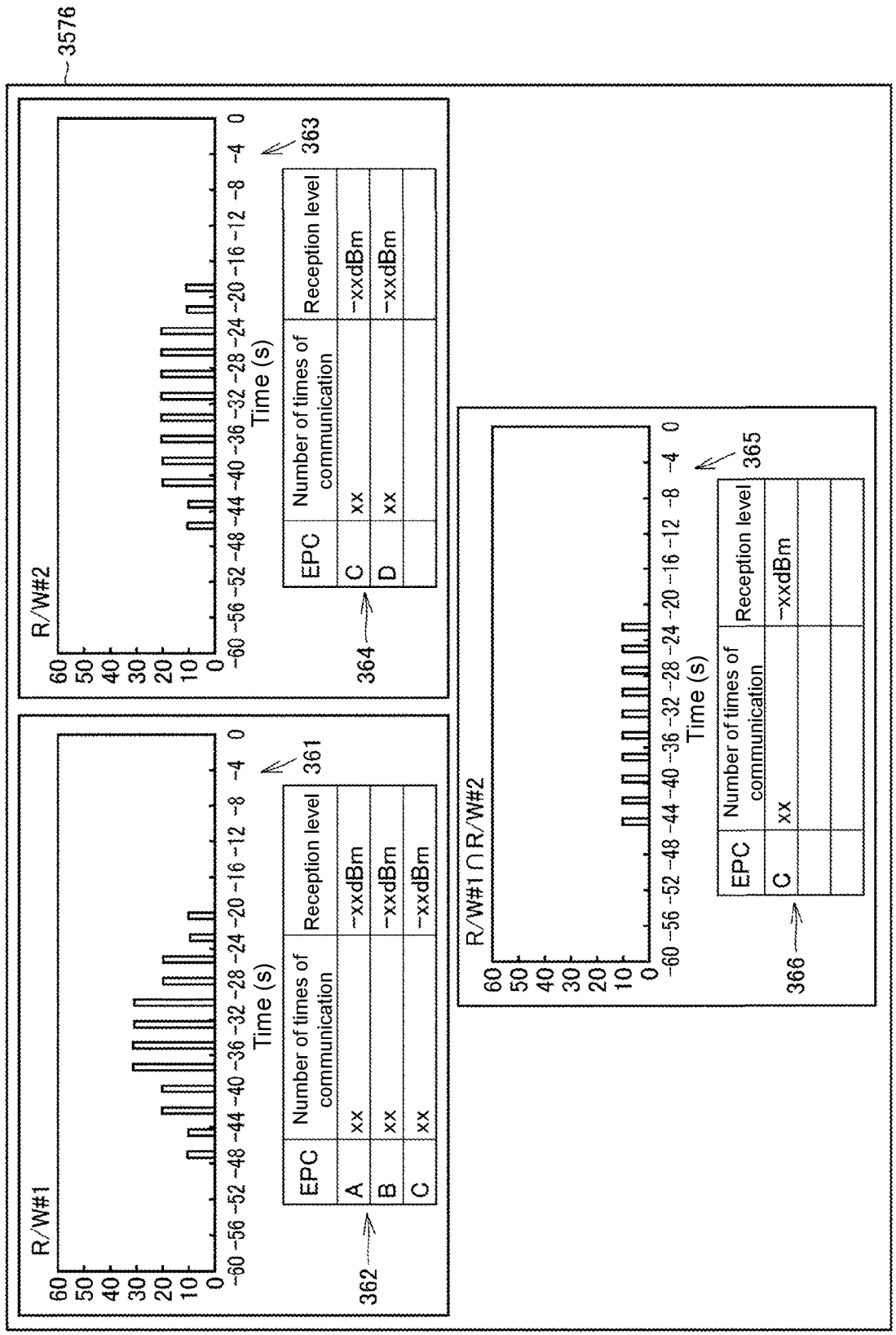
FIG. 23 is a view showing an example of a screen including a graph showing the number of reads.

FIG. 23 is a view showing an example of a screen including a graph showing the number of reads. Referring to FIG. 23, the PC 300 displays a screen 3576 based on receipt of a predetermined operation.

The screen 3576 includes a bar graph 361 showing the number of the RF tags 500 read by the reader/writer 100A chronologically and a table 362 of the reception levels of the signals that the reader/writer 100A receives from the RF tags 500. The screen 3576 also includes a bar graph 363 showing the number of the RF tags 500 read by the reader/writer 100B chronologically and a table 364 of the reception levels of the signals that the reader/writer 100B receives from the RF tags 500.

More specifically, the display control part 315 of the PC 300 displays the bar graph 361 showing a temporal transition of the number of RF tags 500 read by the reader/writer 100A, among the RF tags 500, in the measurement period T and the bar graph 363 showing a temporal transition of the number of RF tags read by the reader/writer 100B, among the RF tags 500, in the measurement period T on the display 357 at the same time. Alternatively, the PC 300 may be configured to selectively display at least one of the bar graph 361 and the bar graph 363 on the display 357.

Furthermore, the screen 3576 includes a bar graph 365 showing the number of the RF tags 500 read in the overlapping area chronologically, and a table 366 of the reception levels of the signals that the reader/writer 100A or the reader/writer 100B receives from the RF tags 500 in the area.

Specifically, the display control part 315 of the PC 300 displays the bar graph 365 showing a temporal transition of the number of RF tags 500 read by both of the reader/writer 100A and the reader/writer 100B, among the RF tags 500, in the measurement period T on the display 357. Typically, also as shown in FIG. 23, the display control part 315 displays the bar graph 361, the bar graph 363, and the bar graph 365 on the display 357 at the same time.

The number of the RF tags 500 read in the overlapping area may be the total number of the RF tags 500 read by both of the reader/writer 100A and the reader/writer 100B or the number of the RF tags 500 read by one of the readers/writers (that is, the average value).

The reception levels in the table 362 are typically the reception levels with respect to the three RF tags 500 (the RF tags in A, B, and C in the EPC column in the table 362), and are the maximum values of the reception levels of the signals received by the reader/writer 100A in the measurement period T. However, the disclosure is not limited thereto. The reception levels in the table 362 may also be the average values of the reception levels in the measurement period T. Similarly, the reception levels in the table 364 are typically the reception levels of the two RF tags 500 (the RF tags in C and D of the EPC column in the table 364), and are the maximum values of the reception levels of the signals received by the reader/writer 100B in the measurement period T. However, the disclosure is not limited thereto. The reception levels in the table 364 may also be the average values of the reception levels in the measurement period T.

In addition, the reception level in the table 366 is typically the maximum value of the reception levels during the communication of two of the reader/writer 100A and the reader/writer 100B with the RF tag 500 (the RF tag in C of the EPC column in the table 366) present in the overlapping area in the measurement period T, namely the reception level measured by either of the reader/writer 100A and the reader/writer 100B. As described above, the average value, instead of the maximum value, of the reception levels may be adopted.

By referring to the screen 3576, the user is able to find suitable installation positions of the readers/writers 100.

(7) The display control part 315 of the PC 300 may display a bar graph showing a temporal transition of the number of times of communication between the reader/writer 100A and the RF tag 500 in the measurement period T and a bar graph showing a temporal transition of the number of times of communication between the reader/writer 100B and the RF tag 500 in the measurement period T. In such case, the PC 300 may be configured to selectively display at least one of the two bar graphs on the display 357.

The display control part 315 of the PC 300 may also display a bar graph showing a temporal transition of the number of times of communication performed between two of the reader/writer 100A and the reader/writer 100B and the RF tags 500 at the time corresponding to the time elapsed from the start time of the measurement period T on the display 357. The display control part 315 may also display a bar graph showing the three temporal transitions on the display 357 at the same time.

G. APPENDIX

As described above, the embodiments disclose the following.

[1] The RFID system (1, 1A) includes a display device (357, 316), a first communication device (100A) communicating with a first radio frequency (RF) tag (500A), which moves, in a non-contact manner, and a second communication device (100B) communicating with the first RF tag (500A) in a non-contact manner. The first communication device (100A) and the second communication device (100B, 100C, 100D) repetitively output communication signals and measure a reception level of a first signal transmitted from the first RF tag (500A) based on the communication signals.

The RFID system (1, 1A) includes a memory part (313), a generating part (314), and a display control part (315). The memory part (313) stores first chronological data (DA_1) representing the reception level of the first signal received by the first communication device (100A) in a predetermined measurement period (T) and second chronological data (DB_1) representing the reception level of the first signal received by the second communication device (100B) in the measurement period (T). The generating part (314) specifies a higher reception level of the reception level of the first signal at the first communication device (100A) and the reception level of the first signal at the second communication device (100B) corresponding to an elapsed time from a start time of the measurement period (T) in the first chronological data (DA_1) and the second chronological data (DB_1) at every elapsed time from the start time and generates third chronological data (DZ_1) representing the specified reception level. The display control part (315) selectively displays at least one of a first image based on the first chronological data (DA_1), a second image based on the second chronological data (DB_1), and a third image based on the third chronological data (DZ_1) on the display device (357, 316) or displays the first image, the second image, and the third image on the display device (357, 316) at the same time.

[2] The first image is a first graph (391, 380) including the first chronological data (DA_1) as a graph component. The second image is a second graph (392, 381) including the second chronological data (DB_1) as a graph component. The third image is a third graph (393, 389) including the third chronological data (DZ_1) as a graph component.

[3] The display control part (315) displays a user interface (381, 382, 383) for receiving a user operation for selectively displaying at least one of the first graph (380), the second graph (381) and the third graph (389) on the display device (357, 316).

[4] The first communication device (100A) and the second communication device (100B) communicate with a second RF tag (500B) moving simultaneously with the first RF tag (500A) in a non-contact manner. The first communication device (100A) and the second communication device (100B) further measure a reception level of a second signal transmitted from the second RF tag (500B) by repetitively outputting the communication signals.

The memory part (313) further stores fourth chronological data (DA_2) representing the reception level of the second signal received by the first communication device (100A) in the measurement period (T) and fifth chronological data (DB_2) representing the reception level of the second signal received by the second communication device (100B) in the measurement period (T).

The display control part (315) displays a graph (380) serving as the first image and including each of the first chronological data (DA_1) and the fourth chronological data (DA_2) as the graph component, and a graph (381) serving as the second image and including each of the second chronological data (DB_1) and the fifth chronological data (DB_2) as a graph component.

[5] The generating part (314) specifies a higher reception level of the reception level of the second signal at the first communication device (100A) and the reception level of the second signal at the second communication device (100B) corresponding to the elapsed time from the start time of the measurement period (T) in the fourth chronological data (DA_2) and the fifth chronological data (DB_2) at every elapsed time from the start time and further generates sixth chronological data (DZ_2) representing the specified reception level. The display control part (315) displays a graph (389) serving as the third image and including each of the third chronological data (DZ_1) and the sixth chronological data (DZ_2) as a graph component (377, 378).

[6] The display control part (315) selectively displays at least one of a first bar graph (361) representing a temporal transition of the number of RF tags read by the first communication device (100A), among a plurality of RF tags (500) including the first RF tag (500A), in the measurement period and a second bar graph (363) representing a temporal transition of the number of RF tags read by the second communication device (100B), among the RF tags (500), in the measurement period on the display device (357, 316), or the display control part (315) displays the first bar graph (361) and the second bar graph (363) on the display device (357, 316) at the same time.

[7] The display control part (315) further displays a third bar graph (365) representing a temporal transition of the number of RF tags (500) read by both of the first communication device (100A) and the second communication device (100B), among the RF tags (500), in the measurement period (T) on the display device (357, 316).

[8] When both of the first communication device (100A) and the second communication device (100B) communicate with the first RF tag (500A) in the measurement period (T), the display control part (315) further displays a maximum value of the reception levels during the communication on the display device (357, 316).

[9] The display control part (315) selectively displays at least one of a first bar graph representing a temporal transition of the number of times of communication between the first communication device (100A) and the first RF tag (500A) in the measurement period (T) and a second bar graph representing a temporal transition of the number of times of communication between the second communication device (100B) and the first RF tag (500A) in the measurement period (T) on the display device (357, 316). Alternatively, the display control part (315) displays the first bar graph and the second bar graph on the display device (357, 316) at the same time.

[10] An information processing method of an RFID system (1,1A) including a first communication device (100A) communicating with a radio frequency (RF) tag (500), which moves, in a non-contact manner and a second communication device (100B) communicating with the RF tag (500) in a non-contact manner. The information processing method includes: storing first chronological data (DA) representing a reception level of a signal received by the first communication device (100A) in a predetermined measurement period (T) and second chronological data (DB) representing a reception level of a signal received by the second communication device (100B) in the measurement period (T); specifying a higher reception level of the reception level of the signal at the first communication device (100A) and the reception level of the signal at the second communication device (100B) corresponding to an elapsed time from a start time of the measurement period (T) in the first chronological data (DA) and the second chronological data (DB) at every elapsed time from the start time and generating third chronological data (DZ) representing the specified reception level; and selectively displaying at least one of a first image based on the first chronological data (DA), a second image based on the second chronological data (DB), and a third image based on the third chronological data (DZ) on a display device (357, 316) or displaying the first image, the second image, and the third image on the display device (357, 316) at the same time.

It should be noted that the embodiments disclosed herein are merely examples for the respective aspects and shall not be construed as being restrictive. The scope of the disclosure shall be defined by the claims, and not by the descriptions of the embodiments described herein. In addition, all equivalents and all the modifications within the claimed scope are intended to be included.

What is claimed is:

1. A radio frequency identification (RFID) system, comprising:
   a display device;
   a first communication device, communicating with a first radio frequency (RF) tag, which moves, in a non-contact manner; and
   a second communication device communicating with the first RF tag in a non-contact manner,
   wherein the first communication device and the second communication device repetitively output communication signals and measure a reception level of a first signal transmitted from the first RF tag based on the communication signals,
   and the RFID system comprises:
   a memory part, storing first chronological data representing the reception level of the first signal received by the first communication device in a predetermined measurement period and second chronological data representing the reception level of the first signal received by the second communication device in the measurement period;
   a generating part, specifying a higher reception level of the reception level of the first signal at the first communication device and the reception level of the first signal at the second communication device corresponding to an elapsed time from a start time of the measurement period in the first chronological data and the second chronological data at every elapsed time from the start time and generating third chronological data representing the specified reception level; and
   a display control part, selectively displaying at least one of a first image based on the first chronological data, a second image based on the second chronological data, and a third image based on the third chronological data on the display device or displaying the first image, the second image, and the third image on the display device at the same time.

2. The RFID system as claimed in claim 1, wherein the first image is a first graph comprising the first chronological data as a graph component,
   the second image is a second graph comprising the second chronological data as a graph component, and
   the third image is a third graph comprising the third chronological data as a graph component.

3. The RFID system as claimed in claim 2, wherein the display control part displays a user interface for receiving a user operation for selectively displaying at least one of the first graph, the second graph and the third graph on the display device.

4. The RFID system as claimed in claim 1, wherein the first communication device and the second communication device communicate with a second RF tag moving simultaneously with the first RF tag in a non-contact manner,
   the first communication device and the second communication device further measure a reception level of a second signal transmitted from the second RF tag by repetitively outputting the communication signals,
   the memory part further stores fourth chronological data representing the reception level of the second signal received by the first communication device in the measurement period and fifth chronological data representing the reception level of the second signal received by the second communication device in the measurement period, and
   the display control part displays a graph serving as the first image and comprising each of the first chronological data and the fourth chronological data as a graph component and a graph serving as the second image and comprising each of the second chronological data and the fifth chronological data as a graph component.

5. The RFID system as claimed in claim 4, wherein the generating part specifies a higher reception level of the reception level of the second signal at the first communication device and the reception level of the second signal at the second communication device corresponding to the elapsed time from the start time of the measurement period in the fourth chronological data and the fifth chronological data at every elapsed time from the start time and further generates sixth chronological data representing the specified reception level, and
   the display control part displays a graph serving as the third image and comprising each of the third chronological data and the sixth chronological data as a graph component.

6. The RFID system as claimed in claim 1, wherein the display control part selectively displays at least one of a first bar graph representing a temporal transition of the number of RF tags read by the first communication device, among a plurality of RF tags comprising the first RF tag, in the measurement period and a second bar graph representing a temporal transition of the number of RF tags read by the second communication device, among the RF tags, in the measurement period on the display device, or the display control part displays the first bar graph and the second bar graph on the display device at the same time.

7. The RFID system as claimed in claim 6, wherein the display control part further displays a third bar graph representing a temporal transition of the number of RF tags read by both of the first communication device and the second communication device, among the RF tags, in the measurement period on the display device.

8. The RFID system as claimed in claim 7, wherein when both of the first communication device and the second communication device communicate with the first RF tag in the measurement period, the display control part further displays a maximum value of the reception levels during the communication on the display device.

9. The RFID system as claimed in claim 1, wherein the display control part selectively displays at least one of a first bar graph representing a temporal transition of the number of times of communication between the first communication device and the first RF tag in the measurement period and a second bar graph representing a temporal transition of the number of times of communication between the second communication device and the first RF tag in the measurement period on the display device, or the display control part displays the first bar graph and the second bar graph on the display device at the same time.

10. The RFID system as claimed in claim 2, wherein the display control part selectively displays at least one of a first bar graph representing a temporal transition of the number of RF tags read by the first communication device, among a plurality of RF tags comprising the first RF tag, in the measurement period and a second bar graph representing a temporal transition of the number of RF tags read by the second communication device, among the RF tags, in the measurement period on the display device, or the display control part displays the first bar graph and the second bar graph on the display device at the same time.

11. The RFID system as claimed in claim 3, wherein the display control part selectively displays at least one of a first bar graph representing a temporal transition of the number of RF tags read by the first communication device, among a plurality of RF tags comprising the first RF tag, in the measurement period and a second bar graph representing a temporal transition of the number of RF tags read by the second communication device, among the RF tags, in the measurement period on the display device, or the display control part displays the first bar graph and the second bar graph on the display device at the same time.

12. The RFID system as claimed in claim 4, wherein the display control part selectively displays at least one of a first bar graph representing a temporal transition of the number of RF tags read by the first communication device, among a plurality of RF tags comprising the first RF tag, in the measurement period and a second bar graph representing a temporal transition of the number of RF tags read by the second communication device, among the RF tags, in the measurement period on the display device, or the display control part displays the first bar graph and the second bar graph on the display device at the same time.

13. The RFID system as claimed in claim 5, wherein the display control part selectively displays at least one of a first bar graph representing a temporal transition of the number of RF tags read by the first communication device, among a plurality of RF tags comprising the first RF tag, in the measurement period and a second bar graph representing a temporal transition of the number of RF tags read by the second communication device, among the RF tags, in the measurement period on the display device, or the display control part displays the first bar graph and the second bar graph on the display device at the same time.

14. The RFID system as claimed in claim 2, wherein the display control part selectively displays at least one of a first bar graph representing a temporal transition of the number of times of communication between the first communication device and the first RF tag in the measurement period and a second bar graph representing a temporal transition of the number of times of communication between the second communication device and the first RF tag in the measurement period on the display device, or the display control part displays the first bar graph and the second bar graph on the display device at the same time.

15. The RFID system as claimed in claim 3, wherein the display control part selectively displays at least one of a first bar graph representing a temporal transition of the number of times of communication between the first communication device and the first RF tag in the measurement period and a second bar graph representing a temporal transition of the number of times of communication between the second communication device and the first RF tag in the measurement period on the display device, or the display control part displays the first bar graph and the second bar graph on the display device at the same time.

16. The RFID system as claimed in claim 4, wherein the display control part selectively displays at least one of a first bar graph representing a temporal transition of the number of times of communication between the first communication device and the first RF tag in the measurement period and a second bar graph representing a temporal transition of the number of times of communication between the second communication device and the first RF tag in the measurement period on the display device, or the display control part displays the first bar graph and the second bar graph on the display device at the same time.

17. The RFID system as claimed in claim 5, wherein the display control part selectively displays at least one of a first bar graph representing a temporal transition of the number of times of communication between the first communication device and the first RF tag in the measurement period and a second bar graph representing a temporal transition of the number of times of communication between the second communication device and the first RF tag in the measurement period on the display device, or the display control part displays the first bar graph and the second bar graph on the display device at the same time.

18. An information processing method of a radio frequency identification (RFID) system comprising a first communication device communicating with a radio frequency (RF) tag, which moves, in a non-contact manner and a second communication device communicating with the RF tag in a non-contact manner, the information processing method comprising:
  storing first chronological data representing a reception level of a signal received by the first communication device in a predetermined measurement period and second chronological data representing a reception level of a signal received by the second communication device in the measurement period;
  specifying a higher reception level of the reception level of the signal at the first communication device and the reception level of the signal at the second communication device corresponding to an elapsed time from a start time of the measurement period in the first chronological data and the second chronological data at every elapsed time from the start time and generating third chronological data representing the specified reception level; and
  selectively displaying at least one of a first image based on the first chronological data, a second image based on the second chronological data, and a third image based on the third chronological data on a display device or displaying the first image, the second image, and the third image on the display device at the same time.

* * * * *